(12) United States Patent
Minezawa et al.

(10) Patent No.: US 9,774,872 B2
(45) Date of Patent: Sep. 26, 2017

(54) COLOR IMAGE ENCODING DEVICE, COLOR IMAGE DECODING DEVICE, COLOR IMAGE ENCODING METHOD, AND COLOR IMAGE DECODING METHOD

(71) Applicant: MITSUBISHI ELECTRIC CORPORATION, Tokyo (JP)

(72) Inventors: Akira Minezawa, Tokyo (JP); Ryoji Hattori, Tokyo (JP); Takayuki Semitsu, Tokyo (JP); Yoshimi Moriya, Tokyo (JP); Norimichi Hiwasa, Tokyo (JP); Shunichi Sekiguchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/781,970

(22) PCT Filed: Apr. 4, 2014

(86) PCT No.: PCT/JP2014/060019
§ 371 (c)(1),
(2) Date: Oct. 2, 2015

(87) PCT Pub. No.: WO2014/163200
PCT Pub. Date: Oct. 9, 2014

(65) Prior Publication Data
US 2016/0050421 A1    Feb. 18, 2016

(30) Foreign Application Priority Data
Apr. 5, 2013  (JP) .................... 2013-079497

(51) Int. Cl.
*G06K 9/36*       (2006.01)
*H04N 19/186*  (2014.01)
(Continued)

(52) U.S. Cl.
CPC ........... *H04N 19/186* (2014.11); *H04N 19/11* (2014.11); *H04N 19/159* (2014.11);
(Continued)

(58) Field of Classification Search
CPC .... H04N 19/11; H04N 19/159; H04N 19/172; H04N 19/176; H04N 19/186; H04N 19/198; H04N 19/44; H04N 19/96
(Continued)

(56) References Cited

U.S. PATENT DOCUMENTS 6,184,935 B1 *  2/2001  Iaquinto .................... G06T 1/60
                                                                  348/441
6,765,587 B1 *  7/2004  Zhang .................. G06T 3/4007
                                                                  345/606

(Continued)

FOREIGN PATENT DOCUMENTS

JP  2008-172599 A   7/2008
JP   2013-5344 A    1/2013
(Continued)

OTHER PUBLICATIONS

Office Action mailed Apr. 12, 2016 in corresponding JP Application No. 2015-510162 with a Partial English Translation.
(Continued)

*Primary Examiner* — Mek Onen Bekele
(74) *Attorney, Agent, or Firm* — Birch, Stewart, Kolasch & Birch, LLP

(57) ABSTRACT

When the signal format of a color image is YUV4:2:2, and an intra prediction parameter, which is used for an intra-frame prediction process on the chrominance signals in a prediction block, shows the same prediction mode as an intra prediction mode for the luminance signal in the prediction block, an intra prediction unit 4 converts an index indicating the intra prediction mode for the luminance signal, and
(Continued)

performs the intra-frame prediction process on the chrominance signals in an intra prediction mode indicated by the index after conversion.

4 Claims, 22 Drawing Sheets

(51) Int. Cl.

| | | |
|---|---|---|
| *H04N 19/159* | (2014.01) | |
| *H04N 19/176* | (2014.01) | |
| *H04N 19/96* | (2014.01) | |
| *H04N 19/11* | (2014.01) | |
| *H04N 19/196* | (2014.01) | |
| *H04N 19/172* | (2014.01) | |
| *H04N 19/44* | (2014.01) | |
| *H04N 19/593* | (2014.01) | |

(52) U.S. Cl.
CPC ......... *H04N 19/172* (2014.11); *H04N 19/176* (2014.11); *H04N 19/198* (2014.11); *H04N 19/44* (2014.11); *H04N 19/593* (2014.11); *H04N 19/96* (2014.11)

(58) Field of Classification Search
USPC ............... 375/240.12, 240.13; 348/223.1; 382/166, 162
See application file for complete search history.

(56) References Cited

U.S. PATENT DOCUMENTS

| | | | | |
|---|---|---|---|---|
| 8,891,620 | B2* | 11/2014 | Nakamura | H04N 19/159 348/453 |
| 8,964,840 | B2* | 2/2015 | Min | H04N 19/44 375/240.01 |
| 2003/0048208 | A1* | 3/2003 | Karczewicz | H03M 7/42 341/67 |
| 2005/0063586 | A1* | 3/2005 | Munsil | H04N 1/4053 382/162 |
| 2008/0130754 | A1* | 6/2008 | Winger | H04N 19/102 375/240.21 |
| 2008/0137743 | A1* | 6/2008 | Kim | H04N 19/176 375/240.13 |
| 2008/0170615 | A1 | 7/2008 | Sekiguchi et al. | |
| 2008/0181304 | A1 | 7/2008 | Sekiguchi et al. | |
| 2011/0058064 | A1* | 3/2011 | Hatano | H04N 1/393 348/223.1 |
| 2013/0039423 | A1* | 2/2013 | Helle | H04N 19/197 375/240.13 |
| 2013/0044183 | A1* | 2/2013 | Jeon | H04N 19/103 348/43 |
| 2013/0142260 | A1* | 6/2013 | Wahadaniah | H04N 19/00569 375/240.12 |
| 2013/0272401 | A1* | 10/2013 | Seregin | H04N 19/00533 375/240.12 |
| 2013/0343648 | A1 | 12/2013 | Sato | |
| 2014/0003512 | A1 | 1/2014 | Sato | |
| 2014/0064381 | A1* | 3/2014 | Terada | H04N 19/463 375/240.24 |
| 2014/0105291 | A1 | 4/2014 | Nakamura et al. | |
| 2014/0153642 | A1* | 6/2014 | Hattori | H04N 19/00042 375/240.03 |
| 2014/0284488 | A1 | 9/2014 | Sanuki et al. | |
| 2014/0294301 | A1* | 10/2014 | Nagaoka | G06T 7/0091 382/173 |
| 2015/0003526 | A1 | 1/2015 | Nakamura et al. | |
| 2015/0124881 | A1* | 5/2015 | Min | H04N 19/44 375/240.12 |
| 2016/0050421 | A1* | 2/2016 | Minezawa | H04N 19/159 382/166 |

FOREIGN PATENT DOCUMENTS

| | | | |
|---|---|---|---|
| JP | 2013-34163 A | 2/2013 | |
| JP | 2013-58939 A | 3/2013 | |
| JP | 2013-150178 A | 8/2013 | |
| KR | 20070077609 A | * 7/2007 | ............. H04N 19/44 |

OTHER PUBLICATIONS

Extended European Search Report dated Oct. 13, 2016 issued in the corresponding European Patent Application No. 14779411.9.

Flynn D. et al. "HEVC Range Extensions Draft 2", 12 JCT-VC Meeting; 103. MPEG Meeting; Jan. 14, 2013-Jan. 23, 2013, Geneva.

Gary J Sullivan et al. "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012, pp. 1649-1668.

Minezawa A. et al. "AHG5: Simplification of chroma intra prediction process for YUV4:2:2 coding", 13, JCT-VC Meeting; 104. MPEG Meeting; Apr. 18, 2013-Apr. 26, 2013.

Bross et al., "High Efficiency Video Coding (HEVC) text specification draft 10 (for FDIS & Consent)", JCTVC-L1003_v30, Joint Collaborative Team on Video Coding (JCT-VC) of ITU-T SG 16 WP 3 and ISO/IEC JTC 1/SC 29/WG 11, 12th Meeting, 2013, total 325 pages.

ITU-T, "High efficiency video coding", Recommendation ITU-T H.265, Apr. 2013, total 317 pages.

* cited by examiner

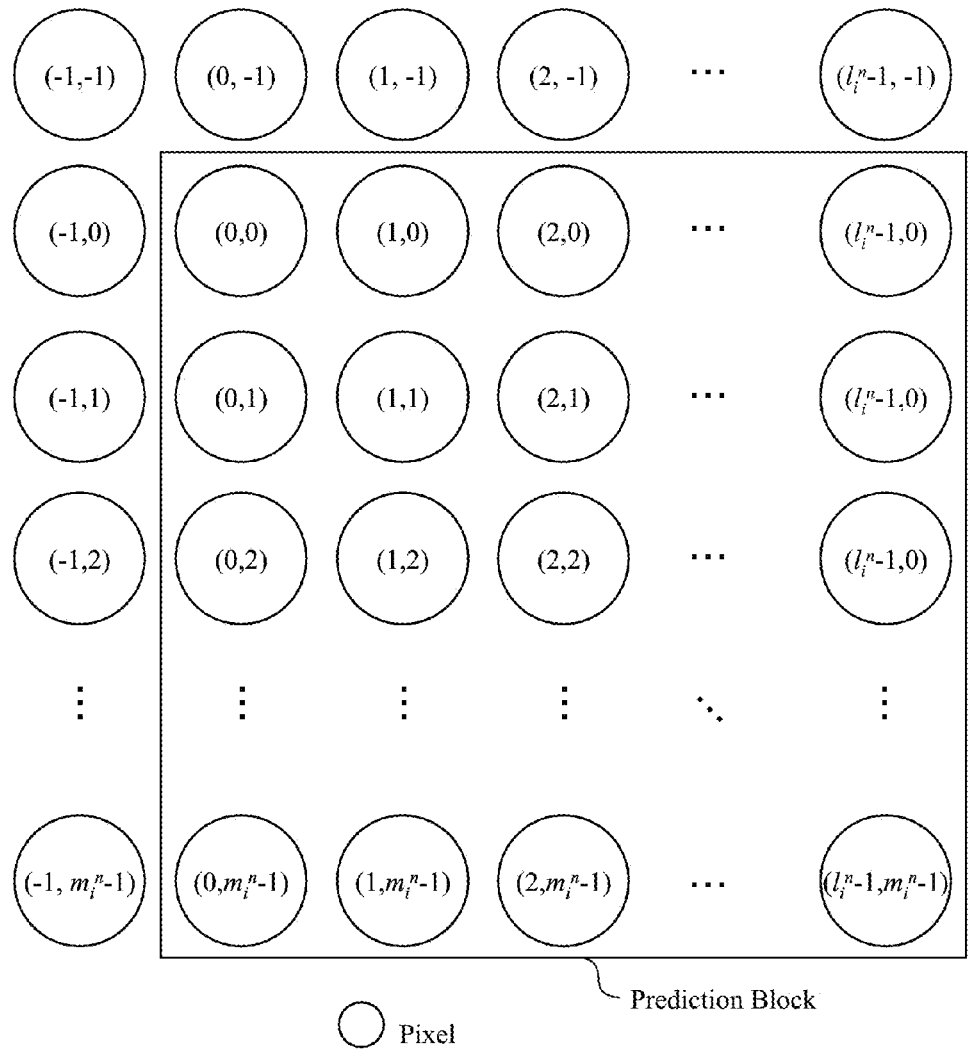

| Index | Class Classifying Method |
|---|---|
| 0 | No Offset Process |
| 1 | EO Method 1 |
| 2 | EO Method 2 |
| 3 | EO Method 3 |
| 4 | EO Method 4 |
| 5 | BO Method |

☐ Significant (Non-Zero) Coefficient
☐ Zero Coefficient

Adjacent Already-Encoded Pixel

Pixel to Be Filtered

Reference Pixel

FIG.22

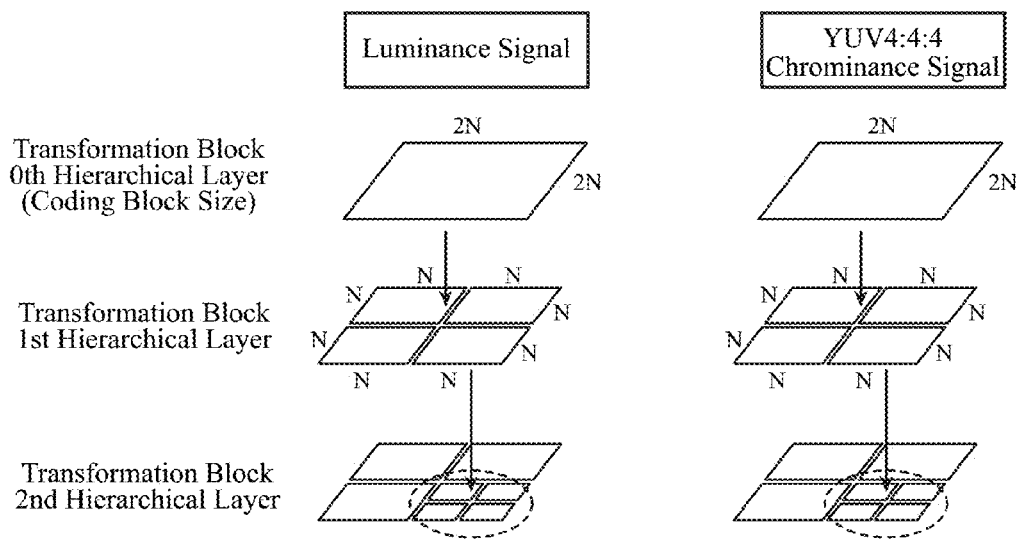

FIG.23

| Intra Prediction Parameter of Chrominance Signals | Chrominance Intra Prediction Mode |
|---|---|
| 0 | Planar Prediction |
| 1 | Vertical Prediction |
| 2 | Horizontal Prediction |
| 3 | Mean Value (DC) Prediction |
| 4 | DM Mode |
| 5 | LM Mode |

FIG.24

| Intra Prediction Parameter of Chrominance Signals | Chrominance Intra Prediction Mode |
|---|---|
| 0 | Planar Prediction |
| 1 | Vertical Prediction |
| 2 | Horizontal Prediction |
| 3 | Mean Value (DC) Prediction |
| 4 | DM Mode |

FIG.29
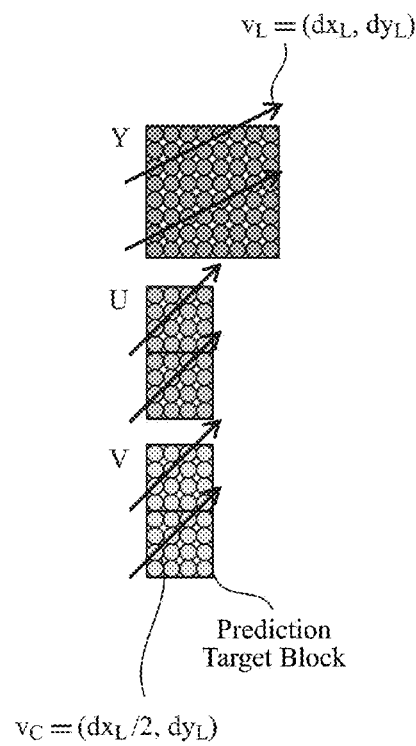
FIG.30
In the Case of Prediction from Left        In the Case of Prediction from Top
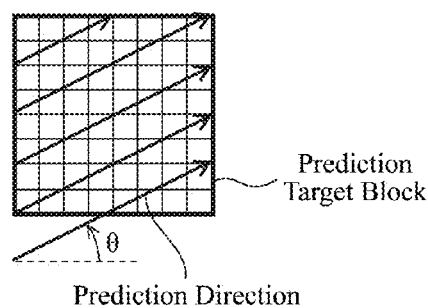 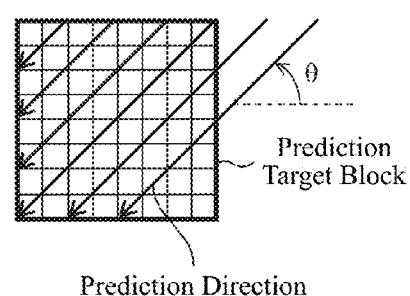

FIG.31

| Intra Prediction Mode Index of Luminance Signal | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| Intra Prediction Mode Index of Chrominance Signals | 0 | 1 | 2 | 2 | 2 | 2 | 3 | 5 | 7 | 8 | 10 | 12 | 13 | 15 | 17 | 18 | 19 | 20 |
| Intra Prediction Mode Index of Luminance Signal | 18 | 19 | 20 | 21 | 22 | 23 | 24 | 25 | 26 | 27 | 28 | 29 | 30 | 31 | 32 | 33 | 34 | |
| Intra Prediction Mode Index of Chrominance Signals | 21 | 22 | 23 | 23 | 24 | 24 | 25 | 25 | 26 | 27 | 27 | 28 | 28 | 29 | 29 | 30 | 31 | |

FIG.32

| Intra Prediction Mode Index | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|
| tanθ | 32/32 | 26/32 | 21/32 | 17/32 | 13/32 | 9/32 | 5/32 | 2/32 | 0 | -2/32 | -5/32 | -9/32 | -13/32 | -17/32 | -21/32 | -26/32 | -32/32 |

| Intra Prediction Mode Index | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|
| tanθ | -32/26 | -32/21 | -32/17 | -32/13 | -32/9 | -32/5 | -32/2 | - | 32/2 | 32/5 | 32/9 | 32/13 | 32/17 | 32/21 | 32/26 | 32/32 |

COLOR IMAGE ENCODING DEVICE, COLOR IMAGE DECODING DEVICE, COLOR IMAGE ENCODING METHOD, AND COLOR IMAGE DECODING METHOD

FIELD OF THE INVENTION

The present invention relates to a color image encoding device and a color image encoding method that encode a color video with a high degree of efficiency, and a color image decoding device and a color image decoding method that decode a color video which is encoded with a high degree of efficiency.

BACKGROUND OF THE INVENTION

For example, in a conventional color image encoding device described in the following nonpatent reference 1, an inputted color image is partitioned into largest coding blocks each having a predetermined size, and each largest coding block is further partitioned hierarchically into smaller coding blocks.

Each coding block is further partitioned into smaller prediction blocks, and an intra-screen prediction and a motion-compensated prediction are performed on each of the prediction blocks to generate a prediction error.

Further, the prediction error is divided hierarchically into transformation blocks within each coding block and each of the transform coefficients is entropy-encoded, thereby achieving a high compression ratio.

In a conventional color image encoding device, when encoding a YUV4:2:0 signal, by making block partitioning information about coding blocks, prediction blocks, and transformation blocks of the chrominance signals be the same as that of the luminance signal, the coding efficiency of the chrominance signals is improved without the necessity to encode information associated with the transformation block size of the chrominance signals.

At that time, except in a case in which a block to be partitioned of a chrominance signal cannot be partitioned because its size is a minimum of possible block sizes, the block size of the chrominance signal is one half of the block size of the luminance signal both in the vertical and horizontal directions.

RELATED ART DOCUMENT

Nonpatent Reference

Nonpatent reference 1: B. Bross, W.-J. Han, J.-R. Ohm, G. J. Sullivan, Y.-K. Wang and T. Wiegand, "High Efficiency Video Coding (HEVC) text specification draft 10 (for FDIS &Consent)", doc. JCTVC-L1003, Joint Collaborative Team on Video Coding (JCT-VC) of ITU-TSG16 WP3 and ISO/IEC JTC1/SC29/WG11, 12th Meeting, 2013

SUMMARY OF THE INVENTION

Problems to be Solved by the Invention

Because a conventional color image encoding device is constructed as above, when the signal format of the color image is YUV4:2:0, and the prediction mode used for the intra-frame prediction process on the chrominance signals is an intra prediction mode common between luminance and chrominances (DM mode) which is the same as the prediction mode used for the intra-frame prediction process on the luminance signal, when the prediction mode for the luminance signal is a directional prediction, what is necessary is just to also perform a directional prediction in the same prediction direction (angle) as that in which a directional prediction is performed on the luminance signal on the chrominance signals, as shown in FIG. 25. A problem is, however, because each of the chrominance signals is a signal in which only the horizontal pixels are thinned out in such a way that the number of horizontal pixels is reduced to one half of that of the luminance signal when the signal format of the color image is YUV4:2:2, if a directional prediction is performed on the chrominance signals in the same prediction direction (angle) as that in which a directional prediction is performed on the luminance signal, as shown in FIG. 26, when assuming the chrominance signals as the ones before the horizontal pixels are thinned out, the prediction direction for the chrominance signals differs from that for the luminance signal, and the prediction efficiency of the chrominance signals is reduced.

The present invention is made in order to solve the above-described problem, and it is therefore an object of the present invention to provide a color image encoding device and a color image encoding method that can improve the coding efficiency of a color image without causing a reduction in the prediction efficiency of the chrominance signals even when the signal format of the color image is YUV4:2:2.

Further, it is therefore another object of the present invention to provide a color image decoding device and a color image decoding method that can correctly decode encoded data, in which an improvement of the coding efficiency is achieved, into an image.

Means for Solving the Problem

In accordance with the present invention, there is provided a color image encoding device in which when the signal format of a color image is YUV4:2:2, an intra predictor converts an index indicating an intra prediction mode for the luminance signal, and performs an intra-frame prediction process on the chrominance signals in an intra prediction mode indicated by the index after conversion.

Advantages of the Invention

In accordance with the present invention, because the color image encoding device is configured in such a way that when the signal format of a color image is YUV4:2:2, the intra predictor converts the index indicating the intra prediction mode for the luminance signal, and performs the intra-frame prediction process on the chrominance signals in an intra prediction mode indicated by the index after conversion, there is provided an advantage of being able to improve the coding efficiency without causing a reduction in the prediction efficiency of the chrominance signals even when the signal format of the color image is YUV4:2:2.

BRIEF DESCRIPTION OF THE FIGURES

FIG. 9 is an explanatory drawing showing relative coordinates of each pixel in the prediction image generation block which are determined with the pixel at the upper left corner of the prediction image generation block being defined as the point of origin;

FIG. 10 is an explanatory drawing showing an example of a quantization matrix;

FIG. 22 is an explanatory drawing showing a transformation block size at the time of performing a compression process on the luminance signal and the chrominance signals in a signal in the YUV4:2:4 format;

FIG. 23 is an explanatory drawing showing an example of a correspondence between an intra prediction parameter and a chrominance intra prediction mode of the chrominance signals;

FIG. 24 is an explanatory drawing showing an example of the correspondence between the intra prediction parameter and the chrominance intra prediction mode of the chrominance signals when not using an LM mode;

FIG. 29 is an explanatory drawing showing a prediction direction vector for the directional prediction in a signal in the YUV4:2:2 format;

FIG. 30 is an explanatory drawing showing a relation between the directional prediction and an angle;

FIG. 31 is an explanatory drawing showing a relation between an intra prediction mode index of the luminance signal and an intra prediction mode index of the chrominance signals in a signal in the YUV4:2:2 format; and FIG. 32 is an explanatory drawing showing a relation between the intra prediction mode index and tan θ,

EMBODIMENTS OF THE INVENTION

Hereafter, in order to explain this invention in greater detail, the preferred embodiments of the present invention will be described with reference to the accompanying drawings.

Embodiment 1

Figure 1:
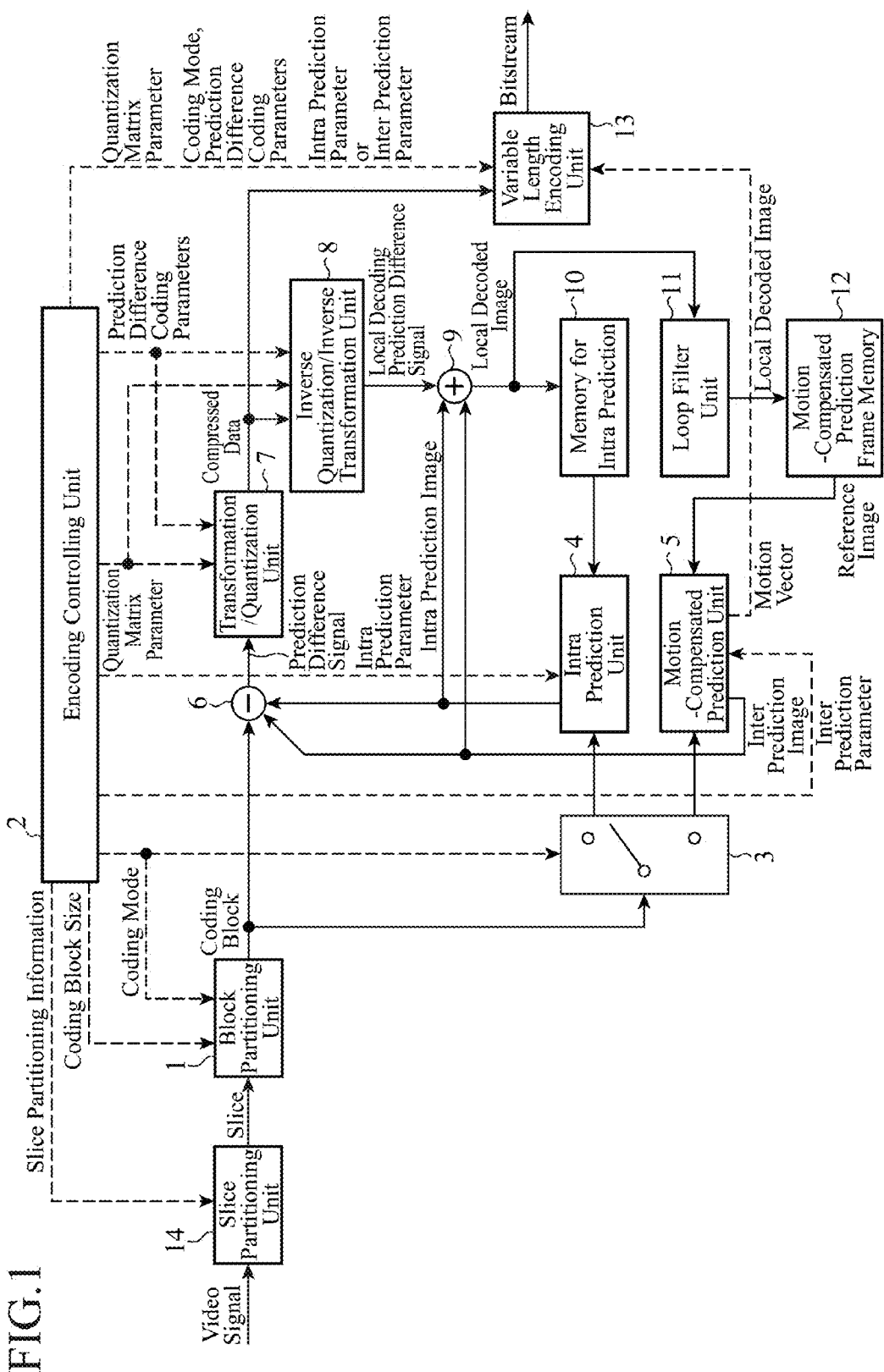
FIG. 1 is a block diagram showing a color image encoding device in accordance with Embodiment 1 of the present invention.

FIG. 1 is a block diagram showing a color image encoding device in accordance with Embodiment 1 of the present invention.

A video signal to be processed by the color image encoding device in accordance with this Embodiment 1 is an arbitrary video signal in which each video frame consists of a series of digital samples (pixels) in two dimensions, horizontal and vertical, including a color video signal in arbitrary color space, such as a YUV signal which consists of a luminance signal and two chrominance signals and an RGB signal outputted from a digital image sensor, a monochrome image signal, an infrared image signal, and so on.

The gradation of each pixel can be an 8-bit, 10-bit, or 12-bit one.

As a matter of course, the input signal can be a still image signal, instead of a video signal, because the still image signal can be assumed to be a video signal which consists of only a single frame.

In the following explanation, for the sake of convenience, the inputted video signal is assumed to be, unless otherwise specified, a signal having a YUV4:2:0 format in which the two chrominance components U and V are subsampled by a factor of two both in the vertical and horizontal directions with respect to the luminance component Y, a signal having a YUV4:2:2 format in which the two chrominance components U and V are subsampled by a factor of two in the horizontal direction with respect to the luminance component Y, or a signal having a YUV4:4:4 format in which the two chrominance components U and V have the same number of samples as the luminance component Y. Further, as to a signal having an RGB4:4:4 format which consists of trichromatic signals of red (R), green (G) and blue (B), each of the signals is assumed to be a signal having the YUV4:4:4 format, and the same encoding as that on the YUV4:4:4 format is performed on the signal. However, how each signal (RGB) having the RGB4:4:4 format is brought into correspondence with each signal (YUV) having the YUV4:4:4 format is not limited (can be set arbitrarily).

A data unit to be processed which corresponds to each frame of the video is referred to as a "picture", and an explanation will be made in this Embodiment 1 by assuming that a "picture" is a signal of an image frame on which progressive scanning is performed. However, when the video signal is an interlaced signal, a "picture" can be a field image signal which is a unit which constructs an image frame.

Referring to FIG. 1, a slice partitioning unit 14 performs a process of, when receiving a video signal as an inputted image, partitioning the inputted image into one or more part images, which are referred to as "slices", according to slice partitioning information determined by an encoding controlling unit 2. Each slice partitioned can be partitioned into up to coding blocks which will be mentioned below.

A block partitioning unit 1 performs a process of, every time when receiving a slice partitioned by the slice partitioning unit 14, partitioning the slice into largest coding blocks each of which is a coding block having a largest size determined by the encoding controlling unit 2, and further partitioning each of the largest coding blocks into coding blocks hierarchically until the number of hierarchical layers reaches an upper limit determined by the encoding controlling unit 2.

More specifically, the block partitioning unit 1 performs a process of partitioning each slice into coding blocks according to partitioning determined by the encoding controlling unit 2, and outputting each of the coding blocks. Each of the coding blocks is further partitioned into one or more prediction blocks each of which is a unit for prediction process.

The encoding controlling unit 2 performs a process of determining the largest size of each of the coding blocks which is a unit to be processed at the time when an encoding process is performed, and also determining the size of each of the coding blocks by determining the upper limit on the number of hierarchical layers at the time when each of the coding blocks having the largest size is hierarchically partitioned.

The encoding controlling unit 2 also performs a process of selecting a coding mode which is applied to each coding block outputted from the block partitioning unit 1 from one or more selectable coding modes (one or more intra coding modes in which the size or the like of each prediction block representing a unit for prediction process differs and one or more inter coding modes in which the size or the like of each prediction block differs). As an example of the selecting method, there is a method of selecting a coding mode which provides the highest degree of coding efficiency for each coding block outputted from the block partitioning unit 1 from the one or more selectable coding modes.

The encoding controlling unit 2 also performs a process of, when the coding mode having the highest degree of coding efficiency is an intra coding mode, determining an intra prediction parameter which is used when performing an intra prediction process on the coding block in the intra coding mode for each prediction block which is a unit for prediction process shown by the above-described intra coding mode, and, when the coding mode having the highest degree of coding efficiency is an inter coding mode, determining an inter prediction parameter which is used when performing an inter prediction process on the coding block in the inter coding mode for each prediction block which is a unit for prediction process shown by the above-described inter coding mode.

The encoding controlling unit 2 further performs a process of determining prediction difference coding parameters which the encoding controlling unit provides for a transformation/quantization unit 7 and an inverse quantization/inverse transformation unit 8. The prediction difference coding parameters include transformation block partitioning information showing partitioning information about transformation blocks each serving as a unit for orthogonal transformation process on a coding block and a quantization parameter defining a quantization stepsize at the time when performing quantization on transform coefficients, etc.

Figure 20:
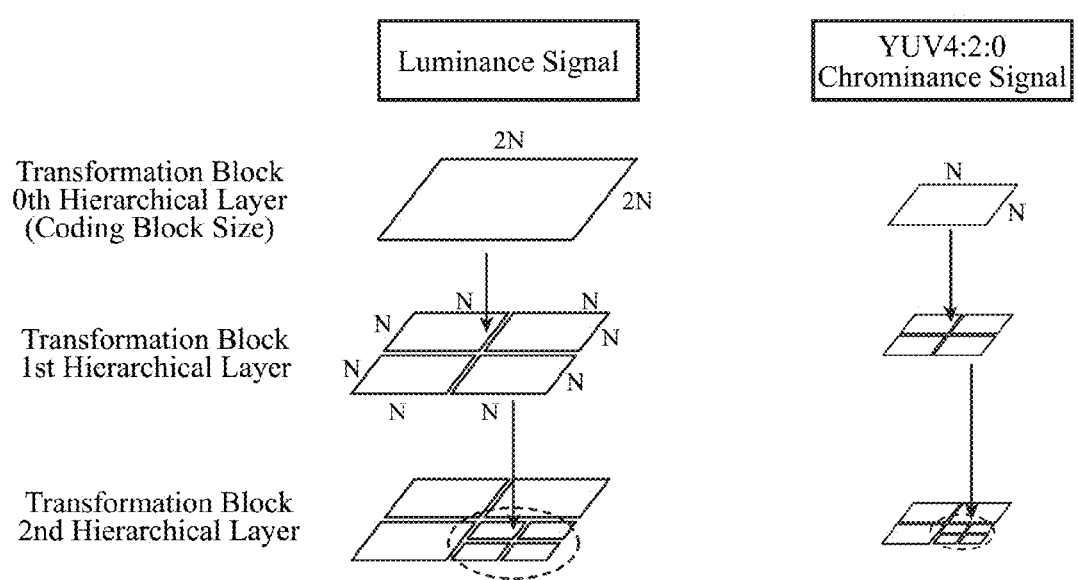
FIG. 20 is an explanatory drawing showing a transformation block size at the time of performing a compression process on the luminance signal and the chrominance signals in a signal in the YUV4:2:0 format.

FIG. 20 is an explanatory drawing showing transformation block sizes at the time of performing a compression process (a transformation process and a quantization process) on the luminance signal and the chrominance signals in a signal having the YUV4:2:0 format.

The transformation block sizes are determined by hierarchically partitioning each coding block into blocks in quadtree form, as shown in FIG. 20.

For example, by determining whether or not to partition each transformation block on the basis of the code amount in the case of partitioning the transformation block, the code amount in the case of not partitioning the transformation block, and an evaluation criterion which takes into consideration coding errors, etc. in such a way that an evaluated value is minimized, an optimal partitioned shape of the transformation block can be determined from the viewpoint of a trade-off between the code amount and the coding errors.

The luminance signal is configured, as shown in, for example, FIG. 20, in such a way that each coding block is hierarchically partitioned into one or more square transformation blocks.

The chrominance signals are configured, as shown in FIG. 20, in such a way that when the input signal format is the YUV4:2:0 signal format, each coding block is hierarchically partitioned into one or more square transformation blocks, like the luminance signal.

In this case, the transformation block size of each of the chrominance signals is half of that of the corresponding luminance signal both in the vertical and horizontal directions.

Figure 21:
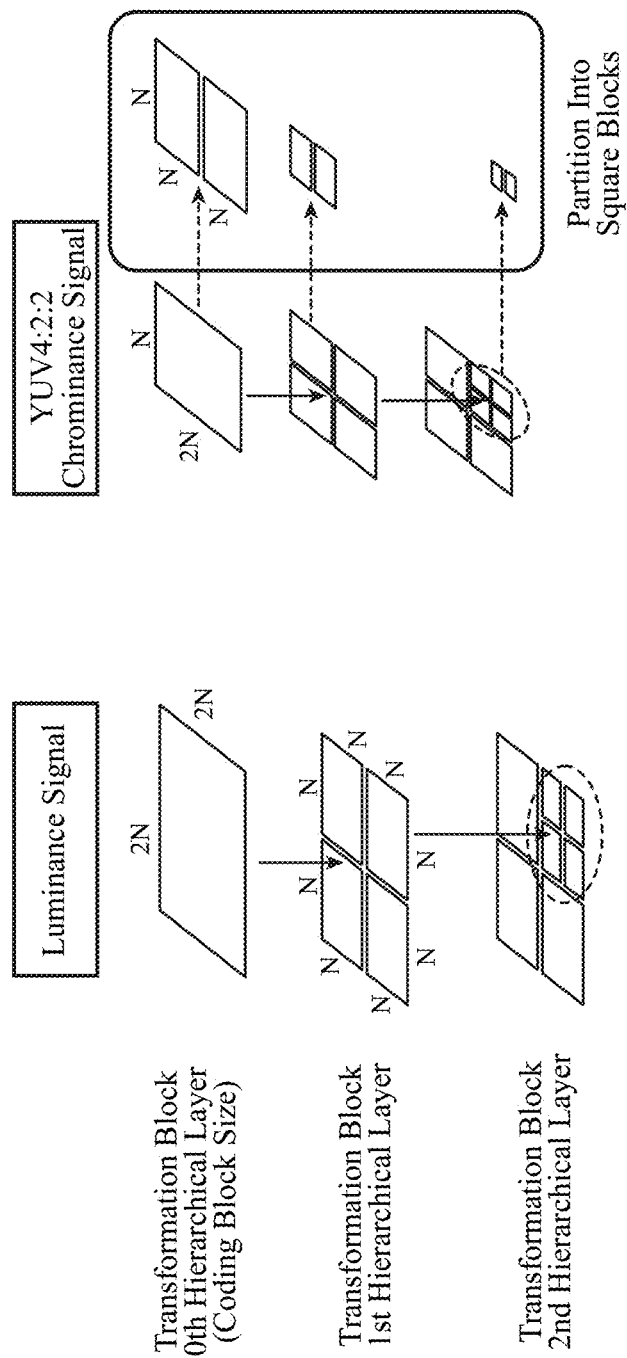
FIG. 21 is an explanatory drawing showing a transformation block size at the time of performing a compression process on the luminance signal and the chrominance signals in a signal in the YUV4:2:2 format.
Figure 25:
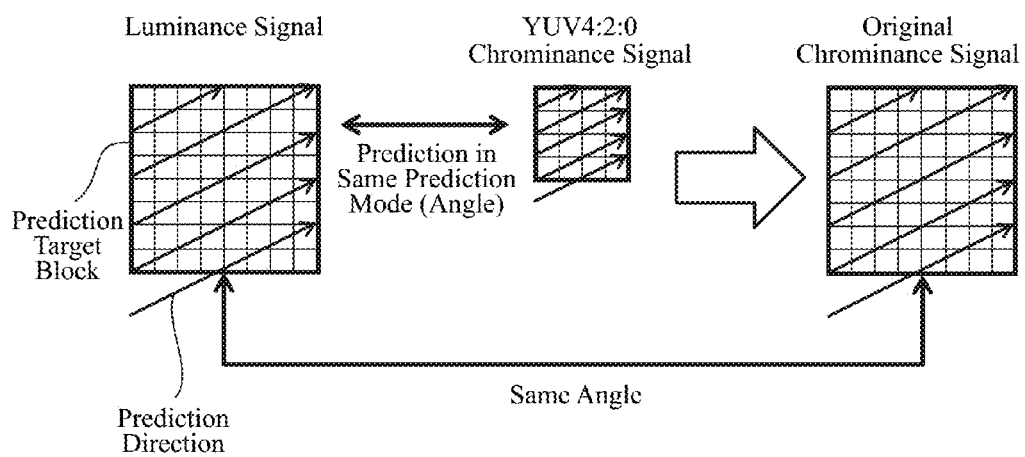
FIG. 25 is an explanatory drawing showing a case of using the same directional prediction for the luminance signal and the chrominance signals in a signal in the YUV4:2:0 format.
Figure 26:
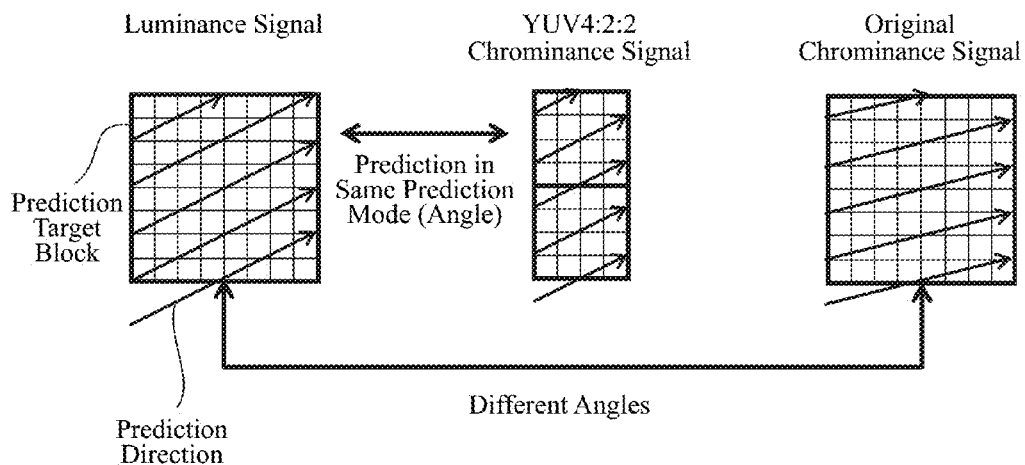
FIG. 26 is an explanatory drawing showing a case of using the same directional prediction for the luminance signal and the chrominance signals in a signal in the YUV4:2:2 format.

As shown in FIG. 21, when the input signal format is the YUV4:2:2 signal format, the same hierarchical partitioning into blocks in quadtree form as that on the luminance signal is performed. Further, because the shape of each partitioned block is a rectangle in which the number of pixels in the vertical direction is twice as large as the number of pixels in the horizontal direction, by further partitioning each partitioned block into two blocks in the vertical direction, each partitioned block is made to consist of two transformation blocks having the same block size as that of the chrominance signals in a YUV4:2:0 signal (a size which is half of the size both in the vertical and horizontal directions of each transformation block of the luminance signal).

Further, when the input signal format is the YUV4:4:4 signal format, as shown in FIG. 22, the same partitioning as that on the transformation blocks of the luminance signal is always performed on the transformation blocks of each of the chrominance signals in such away that the transformation blocks are configured to have the same sizes.

Information about the partitioning of the luminance signal into the transformation blocks is outputted to a variable length encoding unit 13 as, for example, a transformation block partitioning flag showing whether or not to perform partitioning for each hierarchical layer.

A select switch 3 performs a process of, when the coding mode determined by the encoding controlling unit 2 is an intra coding mode, outputting the coding block outputted from the block partitioning unit 1 to an intra prediction unit 4, and, when the coding mode determined by the encoding controlling unit 2 is an inter coding mode, outputting the coding block outputted from the block partitioning unit 1 to a motion-compensated prediction unit 5.

The intra prediction unit 4 performs, when an intra coding mode is selected, as the coding mode associated with the coding block outputted from the select switch 3, by the encoding controlling unit 2, an intra prediction process (intra-frame prediction process) using the intra prediction parameter determined by the encoding controlling unit 2 while referring to a local decoded image stored in a memory 10 for intra prediction, and then performs a process of generating an intra prediction image. The intra prediction unit 4 constructs an intra predictor.

More specifically, as to the luminance signal, the intra prediction unit 4 performs the intra prediction process (intra-frame prediction process) using the intra prediction parameter of the luminance signal, and generates a prediction image of the luminance signal.

On the other hand, as to the chrominance signals, when the intra prediction parameter of the chrominance signals shows that the same prediction mode as the intra prediction mode for the luminance signal is used (when the intra prediction parameter shows an intra prediction mode common between luminance and chrominances (DM mode)), the intra prediction unit performs the same intra-frame prediction as that on the luminance signal, to generate prediction images of the chrominance signals.

Further, when the intra prediction parameter of the chrominance signals shows a vertical prediction mode or a horizontal prediction mode, the intra prediction unit performs a directional prediction on the chrominance signals to generate prediction images of the chrominance signals.

Further, when the intra prediction parameter of the chrominance signals shows a chrominance signal prediction mode using a luminance correlation (LM mode), the intra prediction unit calculates a correlation parameter showing a correlation between the luminance signal and the chrominance signals by using the luminance signals and the chrominance signals of a plurality of pixels adjacent to the upper and left sides of a block for which a prediction image is to be generated, and generates prediction images of the chrominance signals by using both the correlation parameter and the luminance signal associated with the block of each of the chrominance signals which is the target for prediction process.

The intra prediction unit can be configured to perform the process in the above-described DM mode or the above-described LM mode and prevent itself from selecting another prediction mode when the input signal format is the YUV4:4:4 signal format.

Because there is a high correlation between the edge position of the luminance signal and those of the chrominance signals in a YUV4:4:4 signal, by prohibiting the application of a prediction mode different from that applied to the luminance signal to the chrominance signals, the amount of information in the intra prediction mode of the chrominance signals can be reduced and the coding efficiency can be improved.

Figure 27:
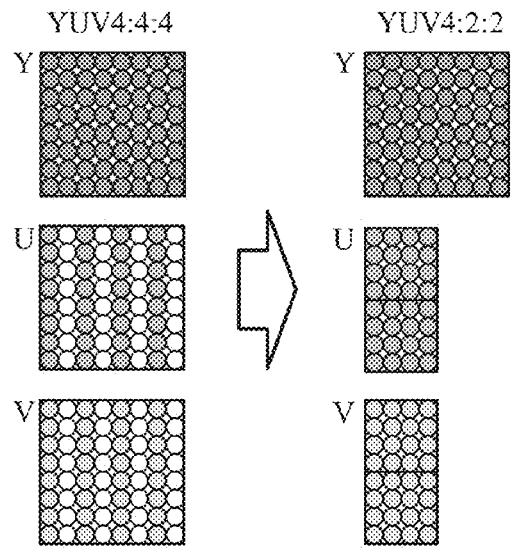
FIG. 27 is an explanatory drawing showing a relation between the YUV4:4:4 format and the YUV4:2:2 format.
Figure 28:
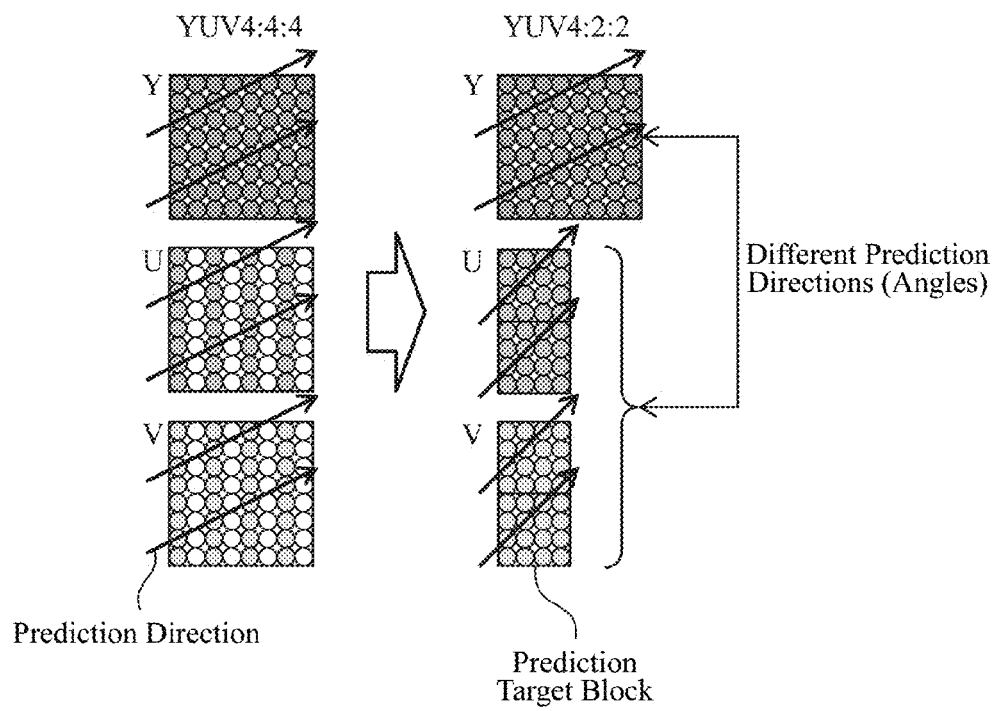
FIG. 28 is an explanatory drawing showing an example of a directional prediction in the YUV4:2:2 format which is equivalent to the use of the same directional prediction for the luminance signal and the chrominance signals in a signal in the YUV4:4:4 format.

Further, when the input signal format is the YUV4:2:2 signal format, if the luminance signal is a square block, as shown in FIG. 27, each of the chrominance signals is a rectangular block in which the number of pixels in the horizontal direction is half as compared with that of the luminance signal. Therefore, in order to apply a prediction in the same direction to the luminance signal and the chrominance signals when a YUV4:4:4 signal is converted into a YUV4:2:2 signal, as shown in FIG. 28, the prediction direction of the chrominance signals is configured to differ from that of the luminance signal on the YUV4:2:2 signal in the case of a directional prediction other than the vertical prediction and the horizontal prediction.

Concretely, when the prediction direction vector of the luminance signal is expressed by $v_L=(dx_L, dy_L)$, as shown in FIG. 29, the prediction direction vector of each of the chrominance signals is expressed by $v_C=(dx_L/2, dy_L)$. More specifically, when the angle of the prediction direction is expressed by $\theta$, as shown in FIG. 30, it is necessary to perform a prediction in a prediction direction having a relation shown by $\tan\theta_C=2\tan\theta_L$, where the angle of the prediction direction of the luminance signal is expressed by $\theta_L$ and the angle of the prediction direction of each of the chrominance signals is expressed by $\theta_C$.

Therefore, when the input signal format is the YUV4:2:2 signal format, at the time of performing the above-described DM mode, the intra prediction unit converts an index of the intra prediction mode which is used for the luminance signal into an index of the intra prediction mode which is used for the prediction on the chrominance signals, and performs the prediction process on the chrominance signals in the intra prediction mode corresponding to the index after conversion. Concretely, a conversion table for the index can be prepared and the intra prediction unit can be configured to convert the index by referring to the conversion table, or a conversion equation can be prepared in advance and the intra prediction unit can be configured to convert the index according to the conversion equation.

By configuring the intra prediction unit in this way, the intra prediction unit can perform an appropriate prediction on the chrominance signals according to the YUV4:2:2 signal format only by performing the conversion of the index without changing the directional prediction process itself.

The motion-compensated prediction unit 5 performs, when an inter coding mode is selected, as the coding mode associated with the coding block outputted from the select switch 3, by the encoding controlling unit 2, a process of comparing the coding block with one or more frames of local decoded images stored in a motion-compensated prediction frame memory 12 to search for a motion vector, performing an inter prediction process (motion-compensated prediction process) by using the motion vector and the inter prediction parameter, such as a frame number to be referred to, which is determined by the encoding controlling unit 2, and generating an inter prediction image.

A subtracting unit 6 performs a process of subtracting the intra prediction image generated by the intra prediction unit 4 or the inter prediction image generated by the motion-compensated prediction unit 5 from the coding block outputted from the block partitioning unit 1, and outputting a prediction difference signal showing a difference image which is a result of the subtraction to the transformation/quantization unit 7.

The transformation/quantization unit 7 refers to the transformation block partitioning information included in the prediction difference coding parameters determined by the encoding controlling unit 2 and performs an orthogonal transformation process (e.g., orthogonal transformation process, such as DCT (discrete cosine transform), DST (discrete sine transform), and KL transform in which bases are designed for a specific learning sequence in advance) on the prediction difference signal outputted from the subtracting unit 6 on a per transformation block basis to calculate transform coefficients, and also refers to the quantization parameter included in the prediction difference coding parameters and performs a process of quantizing the transform coefficients of each transformation block and then outputting compressed data which are the transform coefficients quantized thereby to the inverse quantization/inverse transformation unit 8 and the variable length encoding unit 13.

When quantizing the transform coefficients, the transformation/quantization unit 7 can perform the process of quantizing the transform coefficients by using a quantization matrix for scaling the quantization stepsize calculated from the above-described quantization parameter for each of the transform coefficients.

FIG. 10 is an explanatory drawing showing an example of the quantization matrix of a 4×4 DCT.

Numerals shown in the figure express scaling values for the quantization stepsizes of the transform coefficients.

For example, in order to suppress the coding bit rate, by performing the scaling in such a way that a transform coefficient in a higher frequency band has a larger quantization stepsize, as shown in FIG. 10, while transform coefficients in a high frequency band which occur in a complicated image area or the like are reduced, thereby suppressing the code amount, the encoding can be performed without reducing information about coefficients in a low frequency band which exert a great influence upon the subjective quality.

Thus, when it is desired that the quantization stepsize for each transform coefficient is controlled, what is necessary is just to use a quantization matrix.

Further, as the quantization matrix, a matrix which is independent for each chrominance signal and for each coding mode (intra coding or inter coding) at each orthogonal transformation size can be used, and either selection of a quantization matrix from a quantization matrix which is prepared, as an initial value, in advance and in common between the color image encoding device and the color image decoding device and an already-encoded quantization matrix or use of a new quantization matrix can be selected.

Therefore, the transformation/quantization unit 7 sets flag information showing whether or not to use a new quantization matrix for each chrominance signal and for each coding mode at each orthogonal transformation size to a quantization matrix parameter to be encoded.

In addition, when a new quantization matrix is used, each of the scaling values in the quantization matrix as shown in FIG. 10 is set to the quantization matrix parameter to be encoded.

In contrast, when a new quantization matrix is not used, an index specifying a matrix to be used from a quantization matrix which is prepared, as an initial value, in advance and in common between the color image encoding device and the color image decoding device and an already-encoded quantization matrix is set to the quantization matrix parameter to be encoded. However, when no already-encoded quantization matrix which can be referred to exists, only a quantization matrix prepared in advance and in common between the color image encoding device and the color image decoding device can be selected.

The inverse quantization/inverse transformation unit 8 refers to the quantization parameter and the transformation block partitioning information included in the prediction difference coding parameters determined by the encoding controlling unit 2 and inverse-quantizes the compressed data outputted from the transformation/quantization unit 7 on a per transformation block basis, and also performs an inverse orthogonal transformation process on the transform coefficients which are the compressed data inverse-quantized thereby and performs a process of calculating a local decoded prediction difference signal corresponding to the prediction difference signal outputted from the subtracting unit 6. When the transformation/quantization unit 7 performs the quantizing process by using the quantization matrix, the inverse quantization/inverse transformation unit refers to the quantization matrix and performs a corresponding inverse quantization process also at the time of performing the inverse quantization process.

An adding unit 9 performs a process of adding the local decoded prediction difference signal calculated by the inverse quantization/inverse transformation unit 8 and either the intra prediction image generated by the intra prediction unit 4 or the inter prediction image generated by the motion-compensated prediction unit 5, to calculate a local decoded image corresponding to the coding block outputted from the block partitioning unit 1.

The memory 10 for intra prediction is a recording medium that stores the local decoded image calculated by the adding unit 9.

A loop filter unit 11 performs a predetermined filtering process on the local decoded image calculated by the adding unit 9, and performs a process of outputting the local decoded image filtering-processed thereby.

Concretely, the loop filter unit performs a filtering (deblocking filtering) process of reducing a distortion occurring at a boundary between transformation blocks and a distortion occurring at a boundary between prediction blocks, a process (pixel adaptive offset process) of adaptively adding an offset on a per pixel basis, an adaptive filtering process of performing a filtering process by adaptively switching among linear filters, such as Wiener filters, and so on.

Figure 11:
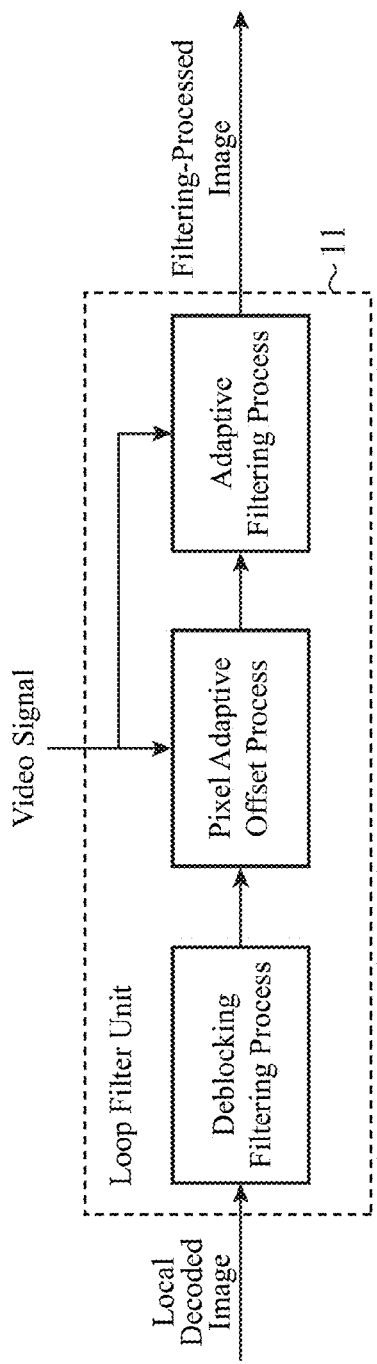
FIG. 11 is an explanatory drawing showing an example of a configuration of using a plurality of loop filtering processes in a loop filter unit of the color image encoding device in accordance with Embodiment 1 of the present invention.

The loop filter unit 11 determines whether or not to perform the process as to each of the above-described processes including the deblocking filtering process, the pixel adaptive offset process, and the adaptive filtering process, and outputs an enable flag of each of the processes, as header information, to the variable length encoding unit 13. When using two or more of the above-described filtering processes, the loop filter unit performs the two or more filtering processes in order. FIG. 11 shows an example of the configuration of the loop filter unit 11 in the case of using a plurality of filtering processes.

In general, while the image quality is improved with increase in the number of types of filtering processes used, the processing load is increased conversely. More specifically, there is a trade-off between the image quality and the processing load. Further, an improvement effect of the image quality which is produced by each of the filtering processes differs depending upon the characteristics of the image which is the target for filtering process. Therefore, what is necessary is just to determine the filtering processes to be used according to the processing load acceptable in the color image encoding device and the characteristics of the image which is the target for filtering process. For example, when there is a demand to reduce the frequency with which the process cannot be performed rather than to provide the configuration shown in FIG. 11, there can be considered an example in which the loop filter unit is configured with only the deblocking filtering process and the pixel adaptive offset process.

In the deblocking filtering process, various parameters used for the selection of the intensity of a filter to be applied to a block boundary can be changed from their initial values. When changing a parameter, the parameter is outputted to the variable length encoding unit 13 as header information.

In the pixel adaptive offset process, the image is partitioned into a plurality of blocks first, a case of not performing the offset process is defined as one class classifying method for each of the blocks, and one class classifying method is selected from among a plurality of class classifying methods which are prepared in advance.

Next, by using the selected class classifying method, each pixel included in the block is classified into one of classes, and an offset value for compensating for a coding distortion is calculated for each of the classes.

Finally, a process of adding the offset value to the luminance value of the local decoded image is performed, thereby improving the image quality of the local decoded image.

Therefore, in the pixel adaptive offset process, the block partitioning information, an index indicating the class classifying method selected for each block, and offset information specifying the offset value calculated for each class on a per block basis are outputted to the variable length encoding unit 13 as header information.

In the pixel adaptive offset process, the image can be always partitioned into fixed size blocks, e.g., largest coding blocks, a class classifying method can be selected for each of the blocks, and an adaptive offset process for each of the classes can be performed. In this case, the need for the above-described block partitioning information can be eliminated, the code amount can be reduced by the code amount required for the block partitioning information, and the coding efficiency can be improved.

In the adaptive filtering process, a class classification is performed on the local decoded image by using a predetermined method, a filter for compensating for a distortion piggybacked on the image is designed for each area (local decoded image) belonging to each class, and a process of filtering the local decoded image is performed by using the filter.

The filter designed for each class is then outputted to the variable length encoding unit 13 as header information.

As the class classifying method, there are a simple method of partitioning the image into equal parts spatially and a method of performing a classification on a per block basis according to the local characteristics (a variance or the like) of the image.

Further, the number of classes used in the adaptive filtering process can be set in advance as a value common between the color image encoding device and the color image decoding device, or can be a parameter to be encoded.

While the improvement effect of the image quality in the latter case is enhanced as compared with that in the former case because the number of classes used in the latter case can be set freely, the code amount is increased by that required for the number of classes because the number of classes is encoded.

Because the video signal needs to be referred to by the loop filter unit 11, as shown in FIG. 11, when performing the pixel adaptive offset process and the adaptive filtering process, the color image encoding device shown in FIG. 1 needs to be modified in such a way that the video signal is inputted to the loop filter unit 11.

The motion-compensated prediction frame memory 12 is a recording medium that stores the local decoded image on which the filtering process is performed by the loop filter unit 11.

The variable length encoding unit 13 variable-length-encodes the compressed data outputted thereto from the transformation/quantization unit 7, the output signal of the encoding controlling unit 2 (the block partitioning information about the partitioning of each largest coding block, the coding mode, the prediction difference coding parameters, and the intra prediction parameter or the inter prediction parameter), and the motion vector outputted from the motion-compensated prediction unit 5 (when the coding mode is an inter coding mode), and generates encoded data.

Figures 13, 14:
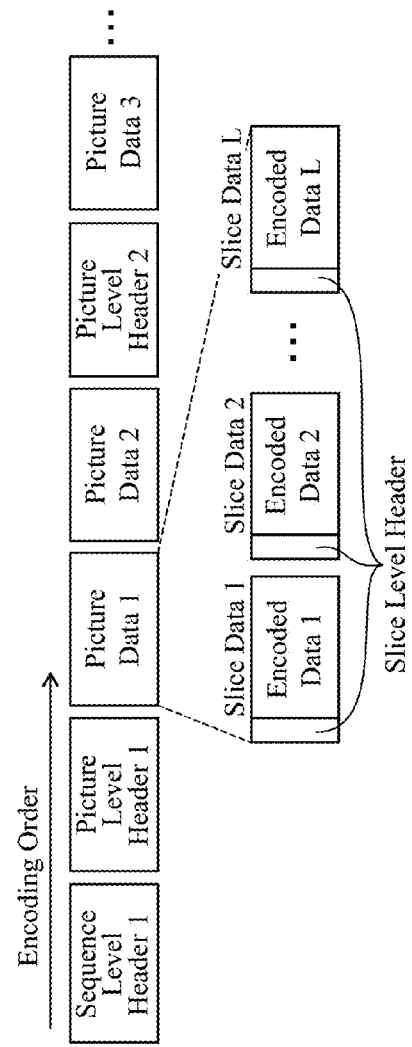
FIG. 13 is an explanatory drawing showing an example of an encoded bitstream.
FIG. 14 is an explanatory drawing showing indexes indicating class classifying methods for use in the pixel adaptive offset process.

The variable length encoding unit 13 also encodes sequence level headers and picture level headers, as the header information of an encoded bitstream, as illustrated in FIG. 13, and generates an encoded bitstream as well as picture data.

Picture data consists of one or more slice data, and each slice data is a combination of a slice level header and encoded data as mentioned above in the slice currently being processed.

A sequence level header is generally a combination of pieces of header information which are common on a per sequence basis, the pieces of header information including the image size, the chrominance signal format, the bit depths of the signal values of the luminance signal and the chrominance signals, and enable flag information about each of the filtering processes (the adaptive filtering process, the pixel adaptive offset process, and the deblocking filtering process) which are performed on a per sequence basis by the loop filter unit 11, enable flag information about the quantization matrix, and so on.

A picture level header is a combination of pieces of header information which are set on a per picture basis, the pieces of header information including an index indicating a sequence level header to be referred to, the number of reference pictures at the time of motion compensation, and a probability table initialization flag for entropy encoding, the quantization matrix parameter, and so on.

A slice level header is a combination of parameters which are set on a per slice basis, the parameters including position information showing at which position of the picture the slice currently being processed exists, an index indicating which picture level header is to be referred to, the encoding type of the slice (all intra encoding, inter encoding, or the like), the flag information showing whether or not to perform each of the filtering processes in the loop filter unit 11 (the adaptive filtering process, the pixel adaptive offset process, and the deblocking filtering process), and so on.

In the example shown in FIG. 1, the block partitioning unit 1, the encoding controlling unit 2, the select switch 3, the intra prediction unit 4, the motion-compensated prediction unit 5, the subtracting unit 6, the transformation/ quantization unit 7, the inverse quantization/inverse transformation unit 8, the adding unit 9, the memory 10 for intra prediction, the loop filter unit 11, the motion-compensated prediction frame memory 12, the variable length encoder 13, and the slice partitioning unit 14, which are the components of the color image encoding device, are assumed to be configured with pieces of hardware for exclusive use (e.g., semiconductor integrated circuits in each of which a CPU is mounted, one chip microcomputers, or the like). As an alternative, in a case in which the color image encoding device is configured with a computer, a program in which the processes performed by the block partitioning unit 1, the encoding controlling unit 2, the select switch 3, the intra prediction unit 4, the motion-compensated prediction unit 5, the subtracting unit 6, the transformation/quantization unit 7, the inverse quantization/inverse transformation unit 8, the adding unit 9, the loop filter unit 11, the variable length encoder 13, and the slice partitioning unit 14 are described can be stored in a memory of the computer and a CPU of the computer can execute the program stored in the memory.

Figure 2:
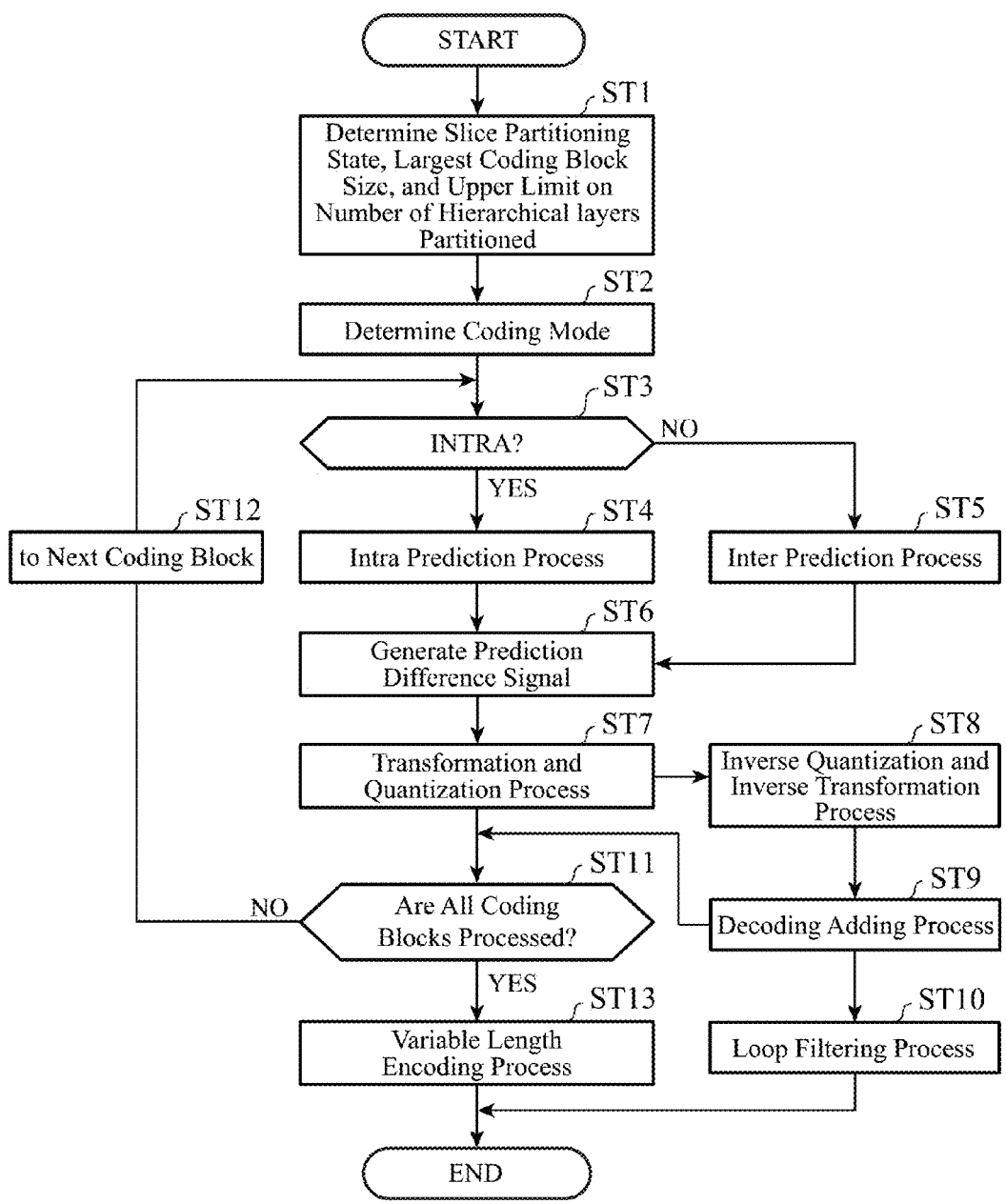
FIG. 2 is a flow chart showing processing (image encoding method) performed by the color image encoding device in accordance with Embodiment 1 of the present invention.

FIG. 2 is a flow chart showing the processing (image encoding method) performed by the color image encoding device in accordance with Embodiment 1 of the present invention.

Figure 3:
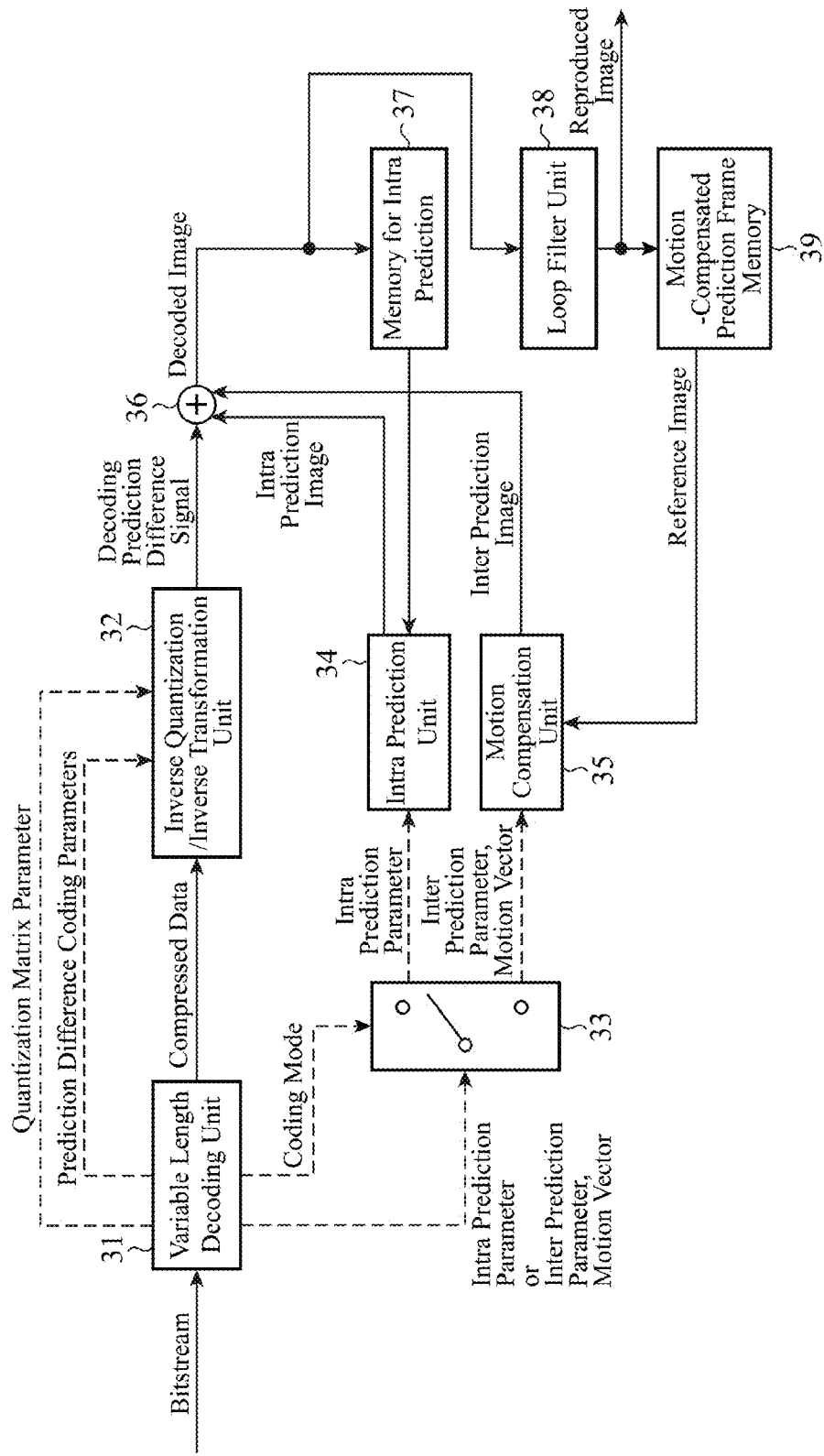
FIG. 3 is a block diagram showing a color image decoding device in accordance with Embodiment 1 of the present invention.

FIG. 3 is a block diagram showing the color image decoding device in accordance with Embodiment 1 of the present invention.

Referring to FIG. 3, when receiving the encoded bitstream generated by the color image encoding device shown in FIG. 1, a variable length decoding unit 31 decodes each of the pieces of header information, such as sequence level headers, picture level headers, and slice level headers, from the bitstream, and also variable-length-decodes the block partitioning information showing the partitioning state of each of coding blocks partitioned hierarchically from the bitstream.

At that time, when the enable flag information about the quantization matrix included in the above-described header information shows "enabled", the variable length decoding unit 31 variable-length-decodes the quantization matrix parameter to specify the quantization matrix. Concretely, for each chrominance signal and for each coding mode at each orthogonal transformation size, when the quantization matrix parameter shows that either a quantization matrix which is prepared, as an initial value, in advance and in common between the color image encoding device and the color image decoding device, or an already-decoded quantization matrix is used (no new quantization matrix is used), the color image decoding device refers to the index information specifying which quantization matrix in the above-described matrices is used, to specify a quantization matrix, and, when the quantization matrix parameter shows that a new quantization matrix is used, specifies, as the quantization matrix to be used, the quantization matrix included in the quantization matrix parameter.

The variable length decoding unit 31 also refers to each header information to specify the slice partitioning state and also specify each largest coding block included in the slice data about each slice, refers to the block partitioning information to partition each largest coding block hierarchically and specify each coding block which is a unit on which the decoding process is to be performed, and performs a process of variable-length-decoding the compressed data, the coding mode, the intra prediction parameter (when the coding mode is an intra coding mode), the inter prediction parameter (when the coding mode is an inter encoding mode), the motion vector (when the coding mode is an inter coding mode), and the prediction difference coding parameters, which are associated with each coding block.

An inverse quantization/inverse transformation unit 32 refers to the quantization parameter and the transformation block partitioning information which are included in the prediction difference coding parameters variable-length-decoded by the variable length decoding unit 31, to inverse-quantize the compressed data variable-length-decoded by the variable length decoding unit 31 on a per transformation block basis, and performs an inverse orthogonal transformation process on the transform coefficients which are the compressed data inverse-quantized thereby and performs a process of calculating a decoding prediction difference signal which is the same as the local decoded prediction difference signal outputted from the inverse quantization/inverse transformation unit 8 shown in FIG. 1.

In this case, from the above-described transformation block partitioning information, the partitioning state of the transformation blocks in each coding block is determined. For example, in the case of a signal having the YUV4:2:0 format, the transformation block sizes are determined by performing hierarchical partitioning of each coding block into blocks in quadtree form, as shown in FIG. 20.

The luminance signal is configured, as shown in, for example, FIG. 20, in such a way that each coding block is hierarchically partitioned into one or more square transformation blocks.

The chrominance signals are configured, as shown in FIG. 20, in such a way that when the input signal format is the YUV4:2:0 signal format, each coding block is hierarchically partitioned into one or more square transformation blocks, like the luminance signal. In this case, the transformation block size of each of the chrominance signals is half of that of the corresponding luminance signal both in the vertical and horizontal directions.

As shown in FIG. 21, when the input signal format is the YUV4:2:2 signal format, the same hierarchical partitioning into blocks in quadtree form as that on the luminance signal is performed. Further, because the shape of each partitioned block is a rectangle in which the number of pixels in the vertical direction is twice as large as the number of pixels in the horizontal direction, by partitioning each partitioned block into two blocks in the vertical direction, each partitioned block is made to consist of two transformation blocks having the same block size as that of the chrominance signals in a YUV4:2:0 signal (a size which is half of the size both in the vertical and horizontal directions of each transformation block of the luminance signal).

When the input signal format is the YUV4:4:4 signal format, as shown in FIG. 22, the same partitioning as that on the transformation blocks of the luminance signal is always performed on the transformation blocks of each of the chrominance signals in such away that the transformation blocks are configured to have the same sizes.

Further, when each header information variable-length-decoded by the variable length decoding unit 31 shows that in the slice currently being processed, an inverse quantization process is performed by using a quantization matrix, the inverse quantization process is performed by using the quantization matrix.

Concretely, the inverse quantization/inverse transformation unit performs the inverse quantization process by using the quantization matrix specified from each header information.

A select switch 33 performs a process of, when the coding mode variable-length-decoded by the variable length decoding unit 31 is an intra coding mode, outputting the intra prediction parameter variable-length-decoded by the variable length decoding unit 31 to an intra prediction unit 34, and, when the coding mode variable-length-decoded by the variable length decoding unit 31 is an inter coding mode, outputting the inter prediction parameter and the motion vector which are variable-length-decoded by the variable length decoding unit 31 to a motion compensation unit 35.

When the coding mode associated with the coding block specified from the block partitioning information variable-length-decoded by the variable length decoding unit 31 is an intra coding mode, the intra prediction unit 34 performs an intra prediction process (intra-frame prediction process) using the intra prediction parameter outputted from the select switch 33 while referring to a decoded image stored in a memory 37 for intra prediction, and performs a process of generating an intra prediction image. The intra prediction unit 34 constructs an intra predictor.

More specifically, as to the luminance signal, the intra prediction unit 34 performs the intra prediction process (intra-frame prediction process) using the above-described intra prediction parameter on the luminance signal, to generate a prediction image of the luminance signal.

On the other hand, as to the chrominance signals, when the intra prediction parameter of the chrominance signals shows that the same prediction mode as the intra prediction mode for the luminance signal is used (when the intra prediction parameter shows the intra prediction mode common between luminance and chrominances (DM mode)), the intra prediction unit performs the same intra-frame prediction as that on the luminance signal, and generates prediction images of the chrominance signals.

Further, when the intra prediction parameter of the chrominance signals shows the vertical prediction mode or the horizontal prediction mode, the intra prediction unit 35 performs a directional prediction on the chrominance signals, and generates prediction images of the chrominance signals.

Further, when the intra prediction parameter of the chrominance signals shows the chrominance signal prediction mode using a luminance correlation (LM mode), the intra prediction unit calculates a correlation parameter showing a correlation between the luminance signal and the chrominance signals by using the luminance signals and the chrominance signals of a plurality of pixels adjacent to the upper and left sides of a block for which a prediction image is to be generated, and generates prediction images of the chrominance signals by using both the correlation parameter and the luminance signal associated with the block of each of the chrominance signals which is the target for prediction process.

In a case in which the color image encoding device is configured to perform the process in the above-described DM mode or the above-described LM mode and prevent itself from selecting another prediction mode when the input signal format is the YUV4:4:4 signal format, the color image decoding device is similarly configured in such a way as to be able to decode the encoded bitstream generated by the color image encoding device.

Because there is a high correlation between the edge position of the luminance signal and those of the chrominance signals in a YUV4:4:4 signal, by prohibiting the application of a prediction mode different from that applied to the luminance signal to the chrominance signals, the amount of information in the intra prediction mode of the chrominance signals can be reduced and the coding efficiency can be improved.

Further, when the input signal format is the YUV4:2:2 signal format, if the luminance signal is a square block, as shown in FIG. 27, each of the chrominance signals is a rectangular block in which the number of pixels in the horizontal direction is half as compared with that of the luminance signal. Therefore, in order to apply a prediction in the same direction to the luminance signal and the chrominance signals when a YUV4:4:4 signal is converted into a YUV4:2:2 signal, as shown in FIG. 28, the prediction direction of the chrominance signals is configured to differ from that of the luminance signal on the YUV4:2:2 signal in the case of a directional prediction other than the vertical prediction and the horizontal prediction.

Concretely, when the prediction direction vector of the luminance signal is expressed by $v_L=(dx_L, dy_L)$, as shown in FIG. 29, the prediction direction vector of each of the chrominance signals is expressed by $v_C=(dx_L/2, dy_L)$. More specifically, when the angle of the prediction direction is expressed by $\theta$, as shown in FIG. 30, it is necessary to perform a prediction in a prediction direction having a relation shown by $\tan \theta_C=2 \tan \theta_L$, where the angle of the prediction direction of the luminance signal is expressed by $\theta_L$ and the angle of the prediction direction of each of the chrominance signals is expressed by $\theta_C$.

Therefore, when the input signal format is the YUV4:2:2 signal format, at the time of performing the above-described DM mode, the intra prediction unit converts an index of the intra prediction mode which is used for the luminance signal into an index of the intra prediction mode which is used for the prediction on the chrominance signals, and performs the prediction process on the chrominance signals in the intra prediction mode corresponding to the index after conversion. Concretely, the intra prediction unit can be configured to convert the index by preparing a conversion table for the index and referring to the conversion table, or a conversion equation can be prepared in advance and the intra prediction unit can be configured to convert the index according to the conversion equation.

By configuring the intra prediction unit in this way, the intra prediction unit can perform an appropriate prediction on the chrominance signals according to the YUV4:2:2 signal format only by performing the conversion of the index without changing the directional prediction process itself.

The motion compensation unit 35 performs a process of, when the coding mode associated with the coding block specified from the block partitioning information variable-length-decoded by the variable length decoding unit 31 is an inter coding mode, performing an inter prediction process (motion-compensated prediction process) using the motion vector and the inter prediction parameter which are outputted from the select switch 33 while referring to a decoded image stored in a motion-compensated prediction frame memory 39, and generating an inter prediction image.

An adding unit 36 performs a process of adding the decoded prediction difference signal calculated by the inverse quantization/inverse transformation unit 32 and the intra prediction image generated by the intra prediction unit 34 or the inter prediction image generated by the motion compensation unit 35, to calculate a decoded image which is the same as the local decoded image outputted from the adding unit 9 shown in FIG. 1.

The memory 37 for intra prediction is a recording medium that stores the decoded image calculated by the adding unit 36 as a reference image used for the intra prediction process.

The loop filter unit 38 performs a predetermined filtering process on the decoded image calculated by the adding unit 36 and performs a process of outputting the decoded image filtering-processed thereby.

Concretely, the loop filter unit performs a filtering (deblocking filtering) process of reducing a distortion occurring at a boundary between transformation blocks and a distortion occurring at a boundary between prediction blocks, a process (pixel adaptive offset process) of adaptively adding an offset on a per pixel basis, an adaptive filtering process of performing a filtering process by adaptively switching among linear filters, such as Wiener filters, and so on.

However, as to each of the above-described filtering processes including the deblocking filtering process, the pixel adaptive offset process, and the adaptive filtering process, the loop filter unit 38 refers to each header information variable-length-decoded by the variable length decoding unit 31 to specify whether or not to perform the process in the slice currently being processed.

Figure 12:
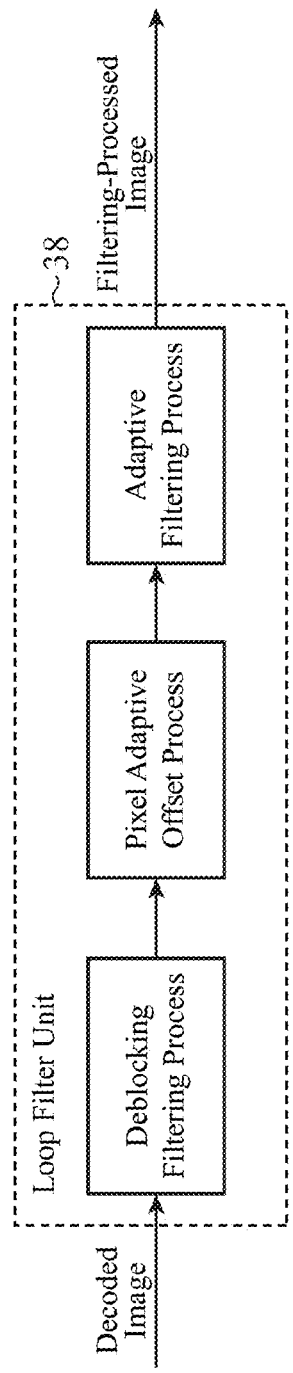
FIG. 12 is an explanatory drawing showing an example of the configuration of using a plurality of loop filtering processes in a loop filter unit of the color image decoding device in accordance with Embodiment 1 of the present invention.

At that time, for example, if the loop filter unit 11 of the color image encoding device is configured as shown in FIG. 11 when performing two or more filtering processes, the loop filter unit 38 is configured as shown in FIG. 12. As a matter of course, if the loop filter unit 11 of the color image encoding device is configured with the deblocking filtering process and the pixel adaptive offset process, the loop filter unit 38 is also configured with the deblocking filtering process and the pixel adaptive offset process.

In the deblocking filtering process, the loop filter unit refers to the header information variable-length-decoded by the variable length decoding unit 31, and, when there exists information for changing the various parameters used for the selection of the intensity of a filter applied to a block boundary from their initial values, performs the deblocking filtering process on the basis of the change information. When no change information exists, the loop filter unit performs the deblocking filtering process according to a predetermined method.

In the pixel adaptive offset process, the loop filter unit 40 partitions the decoded image into blocks on the basis of the block partitioning information for the pixel adaptive offset process, which is variable-length-decoded by the variable length decoding unit 31, refers to the index variable-length-decoded by the variable length decoding unit 31 and indicating the class classifying method of each of the blocks on a per block basis, and, when the index does not indicate "does not perform the offset process", performs a class classification on each pixel in each of the blocks according to the class classifying method indicated by the above-described index.

As candidates for the class classifying method, the same candidates as those for the class classifying method of the pixel adaptive offset process performed by the loop filter unit 11 are prepared in advance.

The loop filter unit then refers to the offset information specifying the offset value calculated for each class on a per block basis, and performs a process of adding the offset to the luminance value of the decoded image.

However, in a case in which the pixel adaptive offset process performed by the loop filter unit 11 of the color image encoding device is configured in such a way as to always partition the image into blocks each having a fixed size (e.g., largest coding blocks) without encoding the block partitioning information, select a class classifying method for each of the blocks, and perform the adaptive offset process for each class, the loop filter unit 38 also performs the pixel adaptive offset process on each block having the same fixed size as that in the loop filter unit 11.

In the adaptive filtering process, after performing a class classification according to the same method as that used by the color image encoding device shown in FIG. 1, the loop filter unit performs the filtering process by using the filter for each class, which is variable-length-decoded by the variable length decoding unit 31, on the basis of information about the class classification.

The motion-compensated prediction frame memory 39 is a recording medium that stores the decoded image filtering-processed by the loop filter unit 38 as a reference image used for the inter prediction process (motion-compensated prediction process).

In the example shown in FIG. 3, the variable length decoding unit 31, the inverse quantization/inverse transformation unit 32, the select switch 33, the intra prediction unit 34, the motion compensation unit 35, the adding unit 36, the memory 37 for intra prediction, the loop filter unit 38, and the motion-compensated prediction frame memory 39, which are the components of the color image decoding device, are assumed to be configured with pieces of hardware for exclusive use (e.g., semiconductor integrated circuits in each of which a CPU is mounted, one chip microcomputers, or the like). As an alternative, in a case in which the color image decoding device is configured with a computer, a program in which the processes performed by the variable length decoding unit 31, the inverse quantization/inverse transformation unit 32, the select switch 33, the intra prediction unit 34, the motion compensation unit 35, the adding unit 36, and the loop filter unit 38 are described can be stored in a memory of the computer and a CPU of the computer can execute the program stored in the memory.

Figure 4:
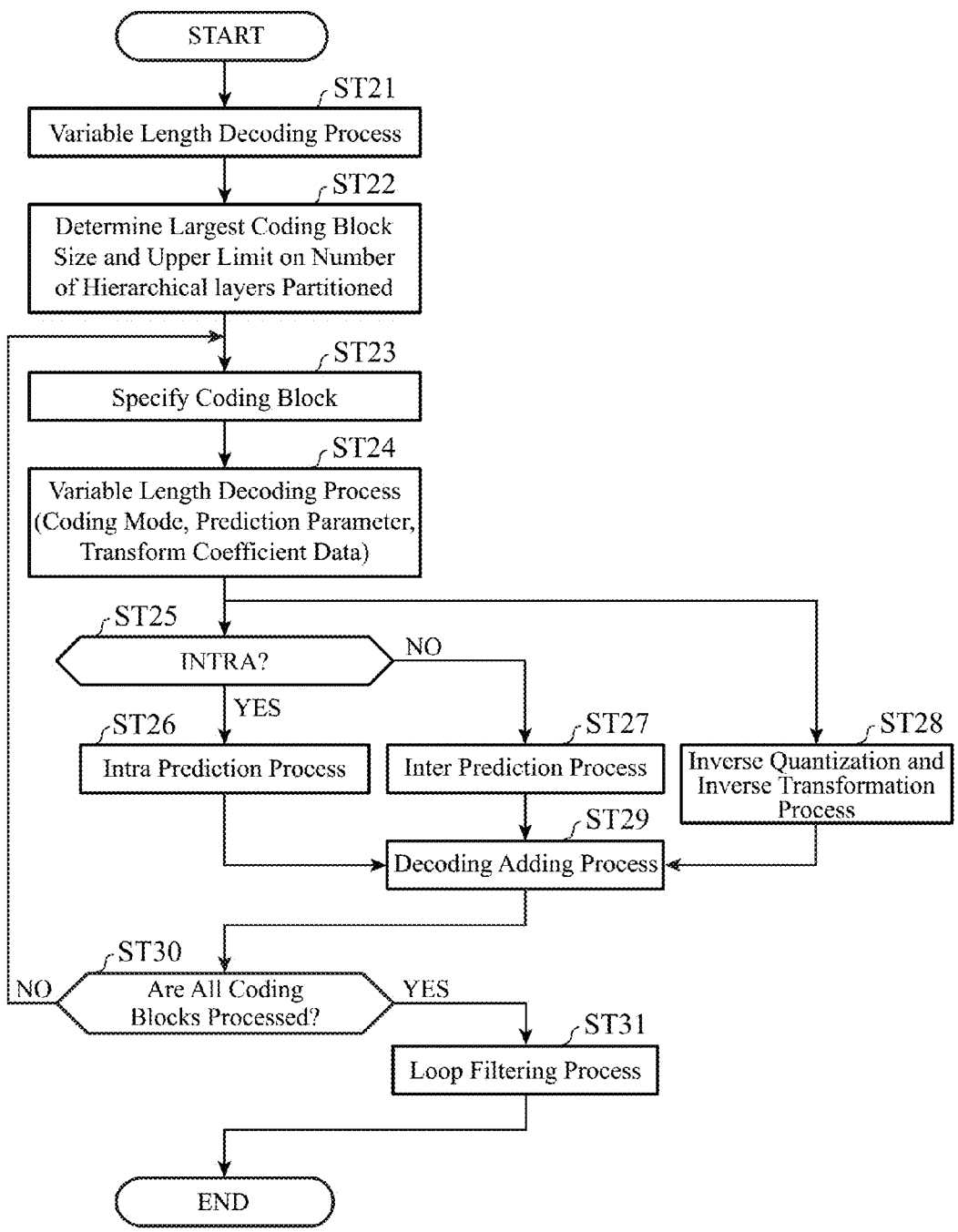
FIG. 4 is a flow chart showing processing (image decoding method) performed by the color image decoding device in accordance with Embodiment 1 of the present invention.

FIG. 4 is a flow chart showing the processing (image decoding method) performed by the color image decoding device in accordance with Embodiment 1 of the present invention.

Next, operations will be explained.

In this Embodiment 1, a case in which the color image encoding device receives each frame image of a video as an inputted image, performs an intra prediction from already-encoded adjacent pixels or a motion-compensated prediction between adjacent frames, and performs a compression process with orthogonal transformation and quantization on an acquired prediction difference signal, and, after that, performs variable length encoding to generate an encoded bitstream, and the color image decoding device decodes the encoded bitstream outputted from the color image encoding device will be explained.

The color image encoding device shown in FIG. 1 is characterized in that the color image encoding device is adapted for local changes of a video signal in a space direction and in a time direction, partitions the video signal into blocks having various sizes, and performs intra-frame and inter-frame adaptive encoding.

In general, the video signal has a characteristic of its complexity locally changing in space and time. From the viewpoint of space, a certain video frame may have, for example, a pattern having a uniform signal characteristic in a relatively large image region, such as a sky image or a wall image, or a pattern in which a pattern having a complicated texture in a small image region, such as a person image or a picture including a fine texture, also coexists.

Also from the viewpoint of time, a sky image and a wall image have a small local change in a time direction in their patterns, while an image of a moving person or object has a larger temporal change because its outline has a movement of a rigid body and a movement of a non-rigid body with respect to time.

Although a process of generating a prediction difference signal having small signal power and small entropy by using a temporal and spatial prediction, thereby reducing the whole code amount, is performed in the encoding process, the code amount of parameters used for the prediction can be reduced as long as the parameters can be applied uniformly to as large an image signal region as possible.

On the other hand, because the amount of errors occurring in the prediction increases when the same prediction parameter is applied to a large image region in an image signal pattern having a large change in time and space, the code amount of the prediction difference signal increases.

Therefore, it is desirable that, for an image region having a large change in time and space, the size of a block subjected to the prediction process to which the same prediction parameter is applied is reduced, thereby increasing the data volume of the parameter which is used for the prediction and reducing the electric power and entropy of the prediction difference signal.

In this Embodiment 1, a configuration of, in order to perform encoding which is adapted for such the typical characteristics of a video signal, starting the prediction process and so on from a predetermined largest block size first, hierarchically partitioning the region of the video signal into blocks, and adapting the prediction process and the process of encoding the prediction difference to each of the blocks partitioned is provided.

First, the processing performed by the color image encoding device shown in FIG. 1 will be explained.

First, the encoding controlling unit 2 determines the slice partitioning state of a picture (current picture) which is the target to be encoded, and also determines the size of each largest coding block which is used for the encoding of the picture and the upper limit on the number of hierarchical layers at the time when each largest coding block is hierarchically partitioned into blocks (step ST1 of FIG. 2).

As a method of determining the size of each largest coding block, for example, there can be a method of determining the same size for all the pictures according to the resolution of the video signal of the inputted image, and a method of quantifying, as a parameter, a variation in the complexity of a local movement of the video signal of the inputted image and then determining a small size for a picture having a large and vigorous movement while determining a large size for a picture having a small movement.

As a method of determining the upper limit on the number of hierarchical layers partitioned, for example, there can be a method of determining the same number of hierarchical layers for all the pictures according to the resolution of the video signal of the inputted image, and a method of increasing the number of hierarchical layers to make it possible to detect a finer movement as the video signal of the inputted image has a larger and more vigorous movement, or decreasing the number of hierarchical layers as the video signal of the inputted image has a smaller movement.

The above-described size of each largest coding block and the upper limit on the number of hierarchical layers at the time when each largest coding block is hierarchically partitioned into blocks can be encoded into the sequence level header or the like. Instead of encoding the size and the upper limit, the color image decoding device can also perform the same determination process.

In the former case, the code amount of the header information increases. However, because the color image decoding device does not have to perform the above-described determination process, the processing load on the color image decoding device can be reduced and, in addition to that, the color image encoding device can search for and send an optimal value.

In the latter case, conversely, while the processing load on the color image decoding device increases since the color image decoding device performs the above-described determination process, the code amount of the header information does not increase.

Further, when the above-described size of each largest coding block and the upper limit on the number of hierarchical layers into which each largest coding block is hierarchically partitioned is encoded into the sequence level header, the smallest block size of the coding blocks, instead of the upper limit on the number of hierarchical layers partitioned, can be encoded. More specifically, because the size of blocks which are acquired when each largest coding block is partitioned until its number of hierarchical layers partitioned reaches the upper limit is the smallest block size of the coding blocks, the color image decoding device can determine the upper limit on the number of hierarchical layers partitioned from the size of the largest coding blocks and the smallest block size of the coding blocks.

The encoding controlling unit 2 also selects a coding mode corresponding to each of the coding blocks into which the inputted image is hierarchically partitioned from one or more available coding modes (step ST2).

More specifically, the encoding controlling unit 2 hierarchically partitions each image region having the largest coding block size into coding blocks each having a coding block size until the number of hierarchical layers partitioned reaches its upper limit which is determined in advance, and determines a coding mode for each of the coding blocks.

A coding mode is one of one or more intra coding modes (generically referred to as "INTRA") and one or more inter coding modes (generically referred to as "INTER"), and the encoding controlling unit 2 selects a coding mode corresponding to each of the coding blocks from among all the coding modes available in the picture currently being processed or a subset of these coding modes.

Each of the coding blocks into which the inputted image is hierarchically partitioned by the block partitioning unit 1, which will be mentioned below, is further partitioned into one or more prediction blocks each of which is a unit on which a prediction process is to be performed, and the state of the partitioning into the one or more prediction blocks is also included as information in the coding mode. More specifically, the coding mode, which is an intra or inter coding mode, is an index identifying what type of partitioned prediction blocks are included.

Although a detailed explanation of a method of selecting a coding mode for use in the encoding controlling unit 2 will be omitted hereafter because the selecting method is a known technique, there is, for example, a method of performing an encoding process on each coding block by using arbitrary available coding modes to examine the coding efficiency, and selecting a coding mode having the highest degree of coding efficiency from among the plurality of available coding modes.

The encoding controlling unit 2 further determines a quantization parameter and a transformation block partitioning state, which are used when a difference image is compressed, for each coding block, and also determines a prediction parameter (an intra prediction parameter or an inter prediction parameter) which is used when a prediction process is performed.

When each coding block is further partitioned into prediction blocks on each of which the prediction process is to be performed, the encoding controlling unit selects a prediction parameter (an intra prediction parameter or an inter prediction parameter) for each of the prediction blocks.

FIG. 20 is an explanatory drawing showing transformation block sizes at the time of performing the compression process (the transformation process and quantization process) on the luminance signal and the chrominance signals in a 4:2:0 format signal.

The transformation block sizes are determined by hierarchically partitioning each coding block into blocks in quadtree form, as shown in FIG. 20.

For example, by determining whether or not to partition each transformation block on the basis of the code amount in the case of partitioning the transformation block, the code amount in the case of not partitioning the transformation block, and an evaluation criterion which takes into consideration coding errors, etc. in such a way that an evaluated value is minimized, an optimal partitioned shape of the transformation block can be determined from the viewpoint of a trade-off between the code amount and the coding errors.

The luminance signal is configured, as shown in, for example, FIG. 20, in such a way that each coding block is hierarchically partitioned into one or more square transformation blocks.

The chrominance signals are configured, as shown in FIG. 20, in such a way that when the input signal format is the YUV4:2:0 signal format, each coding block is hierarchically partitioned into one or more square transformation blocks, like the luminance signal. In this case, the transformation block size of each of the chrominance signals is half of that of the corresponding luminance signal both in the vertical and horizontal directions.

As shown in FIG. 21, when the input signal format is the YUV4:2:2 signal format, the same hierarchical partitioning into blocks in quadtree form as that on the luminance signal is performed. Further, because the shape of each partitioned block is a rectangle in which the number of pixels in the vertical direction is twice as large as the number of pixels in the horizontal direction, by partitioning each partitioned block into two blocks in the vertical direction, each partitioned block is made to consist of two transformation blocks having the same block size as that of the chrominance signals in a YUV4:2:0 signal (a size which is half of the size both in the vertical and horizontal directions of the transformation blocks of the luminance signal).

Further, when the input signal format is the YUV4:4:4 signal format, as shown in FIG. 22, the same partitioning as that on the transformation blocks of the luminance signal is always performed on the transformation blocks of the chrominance signals in such away that the transformation blocks are configured to have the same size.

The encoding controlling unit 2 outputs the prediction difference coding parameters including the transformation block partitioning information showing the partitioning information about the transformation blocks in each coding block, and the quantization parameter defining the quantization stepsize at the time of performing quantization on the transform coefficients to the transformation/quantization unit 7, the inverse quantization/inverse transformation unit 8, and the variable length encoding unit 13.

The encoding controlling unit 2 also outputs the intra prediction parameter to the intra prediction unit 4 as needed.

The encoding controlling unit 2 further outputs the inter prediction parameter to the motion-compensated prediction unit 5 as needed.

When receiving the video signal as the inputted image, the slice partitioning unit 14 partitions the inputted image into one or more slices which are part images according to the slice partitioning information determined by the encoding controlling unit 2.

Every time when receiving each of the slices from the slice partitioning unit 14, the block partitioning unit 1 partitions the slice into coding blocks each having the largest coding block size determined by the encoding controlling unit 2, and further partitions each of the largest coding blocks, into which the inputted image is partitioned, into coding blocks hierarchically, these coding blocks being determined by the encoding controlling unit 2, and outputs each of the coding blocks.

Figure 5:
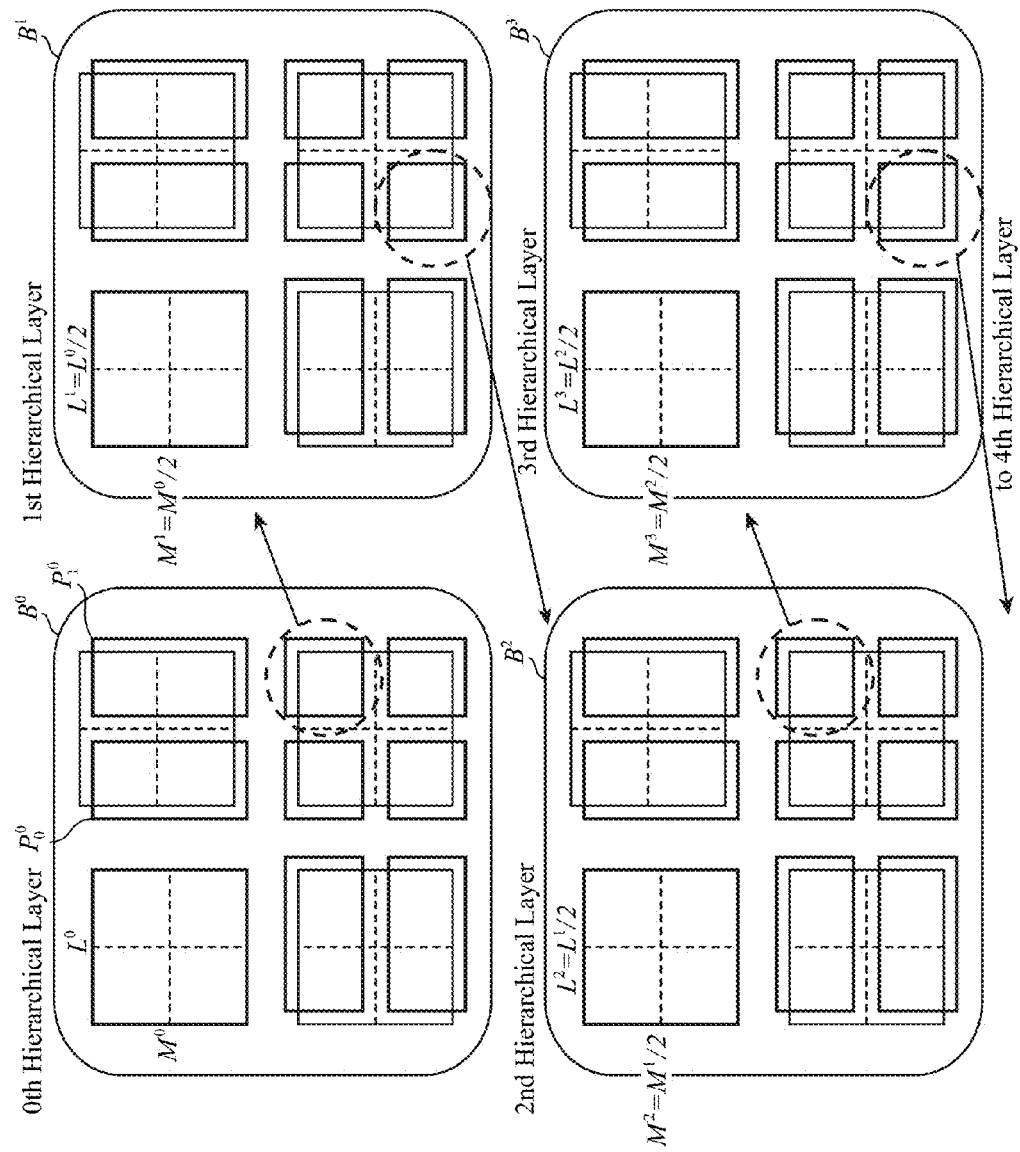
FIG. 5 is an explanatory drawing showing an example in which each largest coding block is partitioned hierarchically into a plurality of coding blocks.

FIG. 5 is an explanatory drawing showing an example in which each largest coding block is hierarchically partitioned into a plurality of coding blocks.

Referring to FIG. 5, each largest coding block is a coding block whose luminance component, which is shown by "0-th hierarchical layer", has a size of ($L^0$, $M^0$).

By performing the partitioning hierarchically with each largest coding block being set as a starting point until the depth of the hierarchy reaches a predetermined depth which is set separately according to a quadtree structure, the coding blocks are acquired.

At the depth of n, each coding block is an image region having a size of ($L^n$, $M^n$).

Although $L^n$ can be the same as or differ from $M^n$, the case of $L^n=M^n$ is shown in FIG. 5.

Hereafter, the coding block size determined by the encoding controlling unit 2 is defined as the size of ($L^n$, $M^n$) in the luminance component of each coding block.

Because quadtree partitioning is performed, ($L^{n+1}$, $M^{n+1}$)=($L^n/2$, $M^n/2$) is always established.

In the case of a color video signal (4:4:4 format) in which all the color components have the same sample number, such as an RGB signal, all the color components have a size of ($L^n$, $M^n$), while in the case of handling a 4:2:0 format, a corresponding chrominance component has a coding block size of ($L^n/2$, $M^n/2$).

Hereafter, each coding block in the nth hierarchical layer is expressed as $B^n$, and a coding mode selectable for each coding block $B^n$ is expressed as $m(B^n)$.

In the case of a color video signal which consists of a plurality of color components, the coding mode $m(B^n)$ can be configured in such a way that an individual mode is used for each color component, or can be configured in such a way that a common mode is used for all the color components. Hereafter, an explanation will be made by assuming that the coding mode indicates a coding mode for the luminance component of each coding block when having a 4:2:0 format in a YUV signal unless otherwise specified.

Each coding block $B^n$ is partitioned into one or more prediction blocks each representing a unit for prediction process by the block partitioning unit 1, as shown in FIG. 5.

Hereafter, each prediction block belonging to each coding block $B^n$ is expressed as $P_i^n$ (i shows a prediction block number in the nth hierarchical layer). An example of $P_0^0$ and $P_1^0$ is shown in FIG. 5.

How the partitioning of each coding block $B^n$ into prediction blocks is performed is included as information in the coding mode $m(B^n)$.

While a prediction process is performed on each of all the prediction blocks $P_i^n$ according to the coding mode $m(B^n)$, an individual prediction parameter (an intra prediction parameter or an inter prediction parameter) can be selected for each prediction block $P_i^n$.

Figure 6:
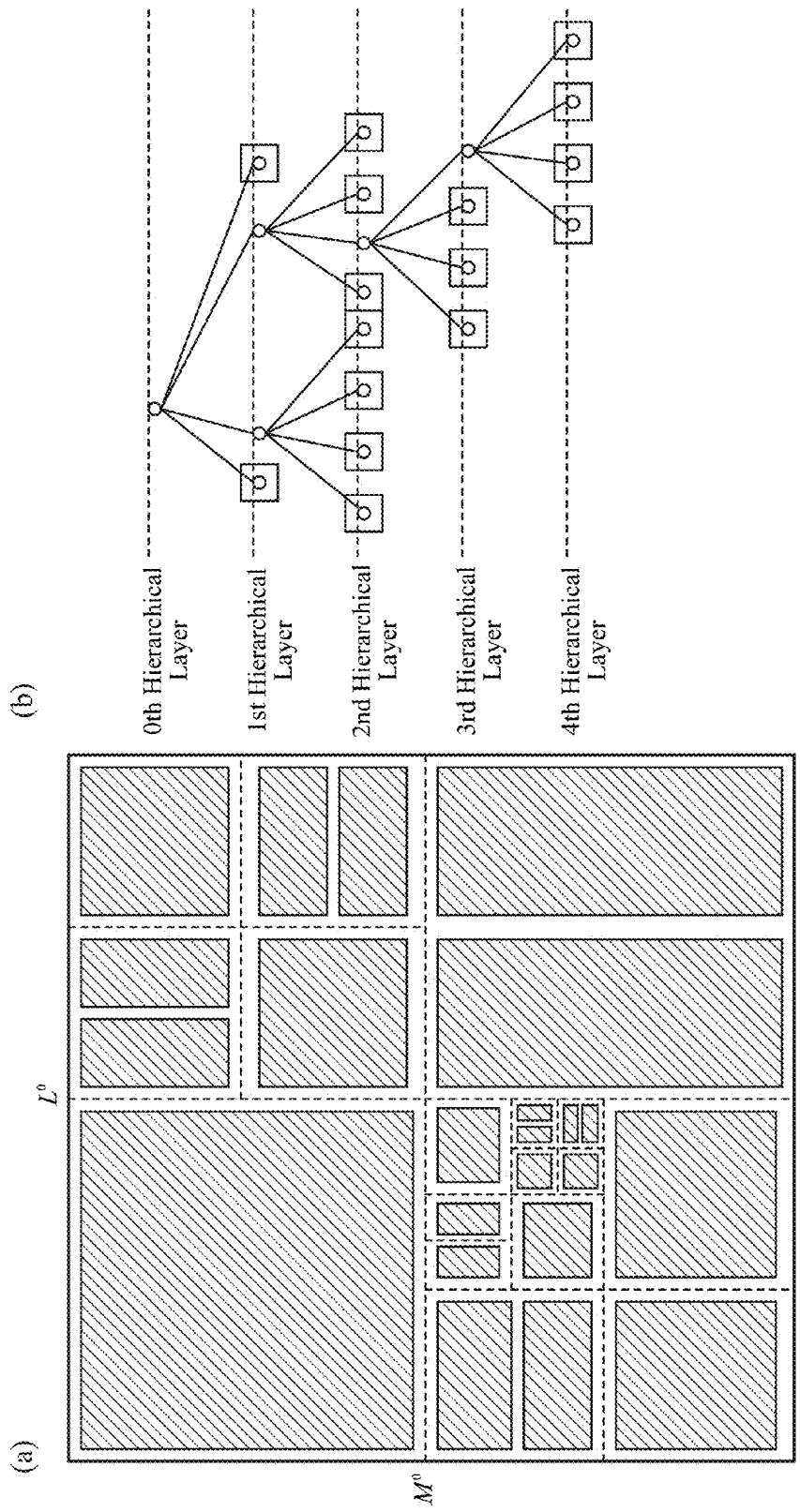
FIG. 6($a$) is an explanatory drawing showing the distribution of coding blocks and prediction blocks after partitioning, and FIG. 6($b$) is an explanatory drawing showing a state in which a coding mode m(B") is assigned to each of the blocks through hierarchical layer partitioning.

The encoding controlling unit 2 generates such a block partitioning state as shown in FIG. 6 for each largest coding block, and then specifies coding blocks.

Each rectangle enclosed by a dotted line of FIG. 6(*a*) shows a coding block, and each block filled with hatch lines in each coding block shows the partitioning state of each prediction block.

FIG. 6(*b*) shows a situation where a coding mode m(B$^n$) is assigned to each node through the hierarchical layer partitioning in the example of FIG. 6(*a*) is shown by using a quadtree graph. Each node enclosed by □ shown in FIG. 6(*b*) is a node (coding block) to which a coding mode m(B$^n$) is assigned.

Information about this quadtree graph is outputted from the encoding controlling unit 2 to the variable length encoding unit 13 together with the coding mode m(B$^n$), and is multiplexed into a bitstream.

When the coding mode m(B$^n$) determined by the encoding controlling unit 2 is an intra coding mode (when m(B$^n$)∈INTRA), the select switch 3 outputs the coding block B$^n$ outputted from the block partitioning unit 1 to the intra prediction unit 4.

In contrast, when the coding mode m(B$^n$) determined by the encoding controlling unit 2 is an inter coding mode (when m(B$^n$)∈INTER), the select switch outputs the coding block B$^n$ outputted from the block partitioning unit 1 to the motion-compensated prediction unit 5.

When the coding mode m(B$^n$) determined by the encoding controlling unit 2 is an intra coding mode (when m(B$^n$)∈INTRA), and the intra prediction unit 4 receives the coding block B$^n$ from the select switch 3 (step ST3), the intra prediction unit 4 performs the intra prediction process on each prediction block $P_i^n$ in the coding block B$^n$ by using the intra prediction parameter determined by the encoding controlling unit 2 while referring to the local decoded image stored in the memory 10 for intra prediction, to generate an intra prediction image $P_{INTRAi}^n$ (step ST4).

Although the details will be described below, because already-encoded pixels adjacent to the target block for prediction are used when performing the process of generating an intra prediction image, the process of generating an intra prediction image must be always performed on a per transformation block basis in such a way that the pixels adjacent to the target block for prediction which are used for the prediction process have been already encoded.

Accordingly, for a coding block in which the coding mode is an intra coding mode, the selectable block sizes of the transformation blocks are limited to sizes equal to or smaller than the size of the prediction blocks. In addition, when each transformation block is smaller than a prediction block (when a plurality of transformation blocks exist in a prediction block), an intra prediction process using the intra prediction parameter determined for this prediction block is performed and the process of generating an intra prediction image is performed on a per transformation block basis.

Because the color image decoding device needs to generate an intra prediction image which is completely the same as the intra prediction image $P_{INTRAi}^n$, the intra prediction parameter used for the generation of the intra prediction image $P_{INTRAi}^n$ is outputted from the encoding controlling unit 2 to the variable length encoding unit 13, and is multiplexed into the bitstream.

The process performed by the intra prediction unit 4 will be mentioned below.

When the coding mode m(B$^n$) determined by the encoding controlling unit 2 is an inter coding mode (when m(B$^n$)∈INTER), and the motion-compensated prediction unit 5 receives the coding block B$^n$ from the select switch 3 (step ST3), the motion-compensated prediction unit 5 compares each prediction block $P_i^n$ in the coding block B$^n$ with the local decoded image which is stored in the motion-compensated prediction frame memory 12 and on which the filtering process is performed, to search for a motion vector, and performs the inter prediction process on each prediction block $P_i^n$ in the coding block B$^n$ by using both the motion vector and the inter prediction parameter determined by the encoding controlling unit 2, to generate an inter prediction image $P_{INTERi}^n$ (step ST5).

Because the color image decoding device needs to generate an inter prediction image which is completely the same as the inter prediction image $P_{INTERi}^n$, the inter prediction parameter used for the generation of the inter prediction image $P_{INTERi}^n$ is outputted from the encoding controlling unit 2 to the variable length encoding unit 13 and is multiplexed into the bitstream.

The motion vector which is searched for by the motion-compensated prediction unit 5 is also outputted to the variable length encoding unit 13 and is multiplexed into the bitstream.

When receiving the coding block B$^n$ from the block partitioning unit 1, the subtracting unit 6 subtracts the intra prediction image $P_{INTRAi}^n$ generated by the intra prediction unit 4 or the inter prediction image $P_{INTERi}^n$ generated by the motion-compensated prediction unit 5 from the prediction block $P_i^n$ in the coding block B$^n$, and outputs a prediction difference signal $e_i^n$ showing a difference image which is the result of the subtraction to the transformation/quantization unit 7 (step ST6).

When receiving the prediction difference signal $e_i^n$ from the subtracting unit 6, the transformation/quantization unit 7 refers to the transformation block partitioning information included in the prediction difference coding parameters determined by the encoding controlling unit 2, and performs an orthogonal transformation process (e.g., an orthogonal transformation process, such as a DCT (discrete cosine transform), a DST (discrete sine transform), or a KL transform in which bases are designed for a specific learning sequence in advance) on the prediction difference signal $e_i^n$ on a per transformation block basis to calculate transform coefficients.

The transformation/quantization unit 7 also refers to the quantization parameter included in the prediction difference coding parameters and quantizes the transform coefficients of each transformation block, and outputs compressed data which are the transform coefficients quantized thereby to the inverse quantization/inverse transformation unit 8 and the variable length encoding unit 13 (step ST7). At that time, the transformation/quantization unit can perform the quantization process by using a quantization matrix for performing scaling on the quantization stepsize calculated from the above-described quantization parameter for each transform coefficient.

As the quantization matrix, a matrix which is independent for each chrominance signal and for each coding mode (intra encoding or inter encoding) at each orthogonal transformation size can be used, and either the selection of a quantization matrix from a quantization matrix which is prepared, as an initial value, in advance and in common between the color image encoding device and the color image decoding device and an already-encoded quantization matrix or the use of a new quantization matrix can be selected.

Therefore, the transformation/quantization unit 7 sets flag information showing whether or not to use a new quantization matrix for each chrominance signal and for each coding mode at each orthogonal transformation size to a quantization matrix parameter to be encoded.

In addition, when a new quantization matrix is used, each of the scaling values in the quantization matrix as shown in FIG. 10 is set to the quantization matrix parameter to be encoded.

In contrast, when a new quantization matrix is not used, an index specifying a matrix to be used from a quantization matrix which is prepared, as an initial value, in advance and in common between the color image encoding device and the color image decoding device and an already-encoded quantization matrix is set to the quantization matrix parameter to be encoded. However, when no already-encoded quantization matrix which can be referred to exists, only a quantization matrix prepared in advance and in common between the color image encoding device and the color image decoding device can be selected.

The transformation/quantization unit 7 then outputs the quantization matrix parameter set thereby to the variable length encoding unit 13.

When receiving the compressed data from the transformation/quantization unit 7, the inverse quantization/inverse transformation unit 8 refers to the quantization parameter and the transformation block partitioning information which are included in the prediction difference coding parameters determined by the encoding controlling unit 2, and inverse-quantizes the compressed data on a per transformation block basis.

When the transformation/quantization unit 7 uses a quantization matrix for the quantization process, the inverse quantization/inverse transformation unit refers to the quantization matrix and performs a corresponding inverse quantization process also at the time of the inverse quantization process.

The inverse quantization/inverse transformation unit 8 also performs an inverse orthogonal transformation process (e.g., an inverse DCT, an inverse DST, an inverse KL transform, or the like) on the transform coefficients which are the compressed data inverse-quantized on a per transformation block basis, and calculates a local decoded prediction difference signal corresponding to the prediction difference signal $e_i^n$ outputted from the subtracting unit 6 and outputs the local decoded prediction difference signal to the adding unit 9 (step ST8).

When receiving the local decoded prediction difference signal from the inverse quantization/inverse transformation unit 8, the adding unit 9 calculates a local decoded image by adding the local decoded prediction difference signal and either the intra prediction image $P_{INTRAi}^n$ generated by the intra prediction unit 4 or the inter prediction image $P_{INTERi}^n$ generated by the motion-compensated prediction unit 5 (step ST9).

The adding unit 9 outputs the local decoded image to the loop filter unit 11, and also stores the local decoded image in the memory 10 for intra prediction.

This local decoded image is an encoded image signal which is used at the time of subsequent intra prediction processes.

When receiving the local decoded image from the adding unit 9, the loop filter unit 11 performs the predetermined filtering process on the local decoded image, and stores the local decoded image filtering-processed thereby in the motion-compensated prediction frame memory 12 (step ST10).

Concretely, the loop filter unit performs a filtering (deblocking filtering) process of reducing a distortion occurring at a boundary between transformation blocks and a distortion occurring at a boundary between prediction blocks, a process (pixel adaptive offset process) of adaptively adding an offset on a per pixel basis, an adaptive filtering process of performing a filtering process by adaptively switching among linear filters, such as Wiener filters, and so on.

The loop filter unit 11 determines whether or not to perform the process as to each of the above-described filtering processes including the deblocking filtering process, the pixel adaptive offset process, and the adaptive filtering process, and outputs the enable flag of each of the processes, as a part of the sequence level header and a part of the slice level header, to the variable length encoding unit 13. When using two or more of the above-described filtering processes, the loop filter unit performs the two or more filtering processes in order. FIG. 11 shows an example of the structure of the loop filter unit 11 in the case of using a plurality of filtering processes.

In general, while the image quality is improved with increase in the number of types of filtering processes used, the processing load is increased conversely. More specifically, there is a trade-off between the image quality and the processing load. Further, an improvement effect of the image quality which is produced by each of the filtering processes differs depending upon the characteristics of the image which is the target for filtering process. Therefore, what is necessary is just to determine the filtering processes to be used according to the processing load acceptable in the color image encoding device and the characteristics of the image which is the target for filtering process.

In the deblocking filtering process, various parameters used for the selection of the intensity of a filter to be applied to a block boundary can be changed from their initial values. When changing a parameter, the parameter is outputted to the variable length encoding unit 13 as header information.

In the pixel adaptive offset process, the image is partitioned into a plurality of blocks first, a case of not performing the offset process is defined as one class classifying method for each of the coding blocks, and one class classifying method is selected from among a plurality of class classifying methods which are prepared in advance.

Next, by using the selected class classifying method, each pixel included in the block is classified into one of classes, and an offset value for compensating for a coding distortion is calculated for each of the classes.

Finally, a process of adding the offset value to the luminance value of the local decoded image is performed, thereby improving the image quality of the local decoded image.

As the method of performing a class classification, there are a method (referred to as a BO method) of classifying each pixel into one of classes according to the luminance value of the local decoded image, and a method (referred to as an EO method) of classifying each pixel into one of classes according to the state of a neighboring region around the pixel (e.g., whether or not the neighboring region is an edge portion) for each of the directions of edges.

These methods are prepared in common between the color image encoding device and the color image decoding device. For example, as shown in FIG. 14, the case of not performing the offset process is defined as one class classifying method, and an index indicating which one of these methods is to be used to perform the class classification is selected for each of the above-described blocks.

Therefore, in the pixel adaptive offset process, the block partitioning information, the index indicating the class classifying method for each block, and the offset information for each block are outputted to the variable length encoding unit 13 as header information.

In the pixel adaptive offset process, for example, the image can be always partitioned into blocks each having a fixed size, such as largest coding blocks, and a class classifying method can be selected for each of the blocks and the adaptive offset process for each class can be performed. In this case, the need for the above-described block partitioning information can be eliminated, the code amount can be reduced by the code amount required for the block partitioning information, and the coding efficiency can be improved.

Further, in the adaptive filtering process, a class classification is performed on the local decoded image by using a predetermined method, a filter for compensating for a distortion piggybacked on the image is designed for each region (local decoded image) belonging to each class, and the process of filtering this local decoded image is performed by using the filter.

The filter designed for each class is then outputted to the variable length encoding unit 13 as header information.

As the class classifying method, there are a simple method of partitioning the image into equal parts spatially and a method of performing a classification on a per block basis according to the local characteristics (a variance and so on) of the image. Further, the number of classes used in the adaptive filtering process can be set in advance to be a value common between the color image encoding device and the color image decoding device, or can be set as a parameter to be encoded.

While the improvement effect of the image quality in the latter case is enhanced as compared with that in the former case because the number of classes used in the latter case can be set freely, the code amount is increased by that required for the number of classes because the number of classes is encoded.

The color image encoding device repeatedly performs the processes of steps ST3 to ST9 until the color image encoding device completes the processing on all the coding blocks B" into which the inputted image is partitioned hierarchically, and, when completing the processing on all the coding blocks B", shifts to a process of step ST13 (steps ST11 and ST12).

The variable length encoding unit 13 variable-length-encodes the compressed data outputted from the transformation/quantization unit 7, the block partitioning information about the partitioning of each largest coding block, which is outputted from the encoding controlling unit 2 (the quadtree information which is shown in FIG. 6 (*b*) as an example), the coding mode m(B") and the prediction difference coding parameters, the intra prediction parameter (when the coding mode is an intra coding mode) or the inter prediction parameter (when the coding mode is an inter coding mode) outputted from the encoding controlling unit 2, and the motion vector outputted from the motion-compensated prediction unit 5 (when the coding mode is an inter coding mode), and generates encoded data showing those encoded results (step ST13).

At that time, as a method of encoding the compressed data which are the quantized orthogonal transformation coefficients, each transformation block is further partitioned into blocks (coding sub-blocks) of 4×4 pixels each of which is called a Coefficient Group (CG), and a process of encoding the coefficients is performed on a per CG basis.

Figure 15:
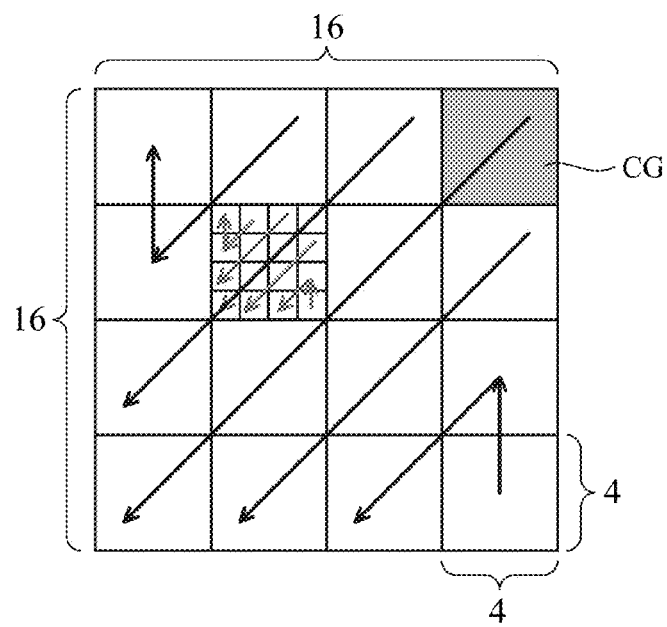
FIG. 15 is an explanatory drawing showing the encoding order of transform coefficients in orthogonal transformation on a size of 16×16 pixels.

FIG. 15 shows the order (scanning order) of encoding the coefficients in each 16×16 pixel transformation block. A process of encoding 16 CGs of 4×4 pixels is performed in order from the CG at the lower right corner in this way, and the 16 coefficients in each CG are further encoded in order from the coefficient at the lower right corner.

Concretely, flag information showing whether a significant (non-zero) coefficient exists in the 16 coefficients in the CG is encoded first, whether or not each coefficient in the CG is a significant (non-zero) coefficient is then encoded in the above-described order only when a significant (non-zero) coefficient exists in the CG, and, for each significant (non-zero) coefficient, information about its coefficient value is finally encoded in order. This process is performed in the above-described order on a per CG basis.

At that time, it is preferable to configure the scanning order in such a way that significant (non-zero) coefficients appear as consecutively as possible, thereby being able to improve the coding efficiency according to the entropy encoding.

Figure 16:
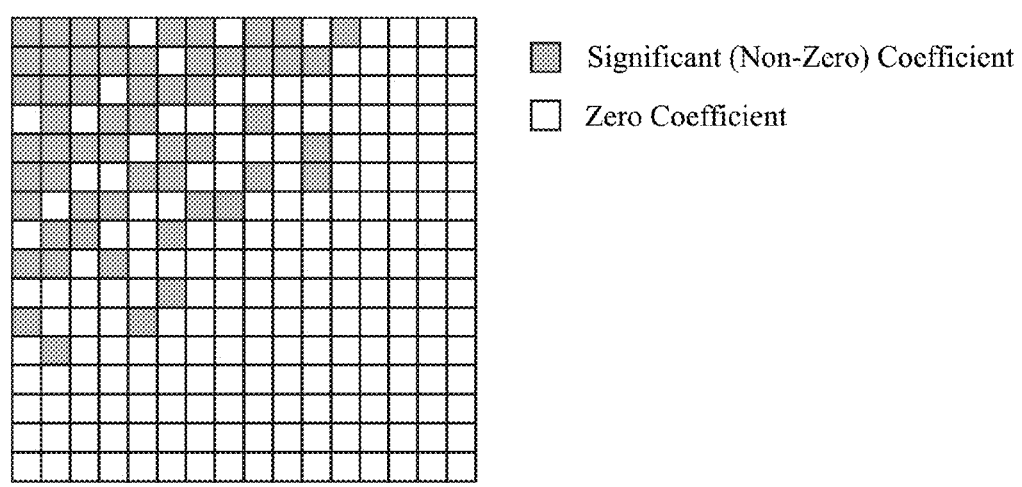
FIG. 16 is an explanatory drawing showing an example of the distribution of transform coefficients in orthogonal transformation on a size of 16×16 pixels.

Because the coefficients after orthogonal transformation, starting with the dc component located at the upper left corner, represent the coefficients of components having a frequency which decreases as they approach the upper left corner, and therefore, in general, significant (non-zero) coefficients appear more frequently as they approach the upper left corner, as shown in the example shown in FIG. 16, the coefficients can be encoded efficiently by encoding them in order from the coefficient at the lower right corner, as shown in FIG. 15.

Although 16×16 pixel transformation blocks are explained in the above-described example, an encoding process for each CG (coding sub-block) is assumed to be performed also on transformation blocks having a block size other than 16×16 pixels, such as 8×8 or 32×32 pixel transformation blocks.

The variable length encoding unit 13 also encodes sequence level headers and picture level headers, as the header information of an encoded bitstream, as illustrated in FIG. 13, and generates an encoded bitstream as well as picture data.

Picture data consists of one or more slice data, and each slice data is a combination of a slice level header and encoded data as mentioned above in the slice currently being processed.

A sequence level header is generally a combination of pieces of header information which are common on a per sequence basis, the pieces of header information including the image size, the chrominance signal format, the bit depths of the signal values of the luminance signal and the chrominance signals, and the enable flag information about each of the filtering processes (the adaptive filtering process, the pixel adaptive offset process, and the deblocking filtering process) which are performed on a per sequence basis by the loop filter unit 11, the enable flag information of the quantization matrix, a flag showing whether or not field encoding is performed, and so on.

A picture level header is a combination of pieces of header information which are set on a per picture basis, the pieces of header information including an index indicating a sequence level header to be referred to, the number of reference pictures at the time of motion compensation, a probability table initialization flag for entropy coding, and so on.

A slice level header is a combination of parameters which are set on a per slice basis, the parameters including position information showing at which position of the picture the slice currently being processed exists, an index indicating which picture level header is to be referred to, the coding type of the slice (all intra coding, inter coding, or the like), the flag information showing whether or not to perform each of the filtering processes in the loop filter unit 11 (the adaptive filtering process, the pixel adaptive offset process, and the deblocking filtering process), and so on.

Next, the process performed by the intra prediction unit 4 will be explained in detail.

The intra prediction unit 4 refers to the intra prediction parameter of each prediction block $P_i^n$ and performs the intra prediction process on the prediction block $P_i^n$ to generate an intra prediction image $P_{INTRAi}^n$, as mentioned above. Hereafter, an intra process of generating an intra prediction image of a prediction block $P_i^n$ in the luminance signal will be explained.

Figure 7:
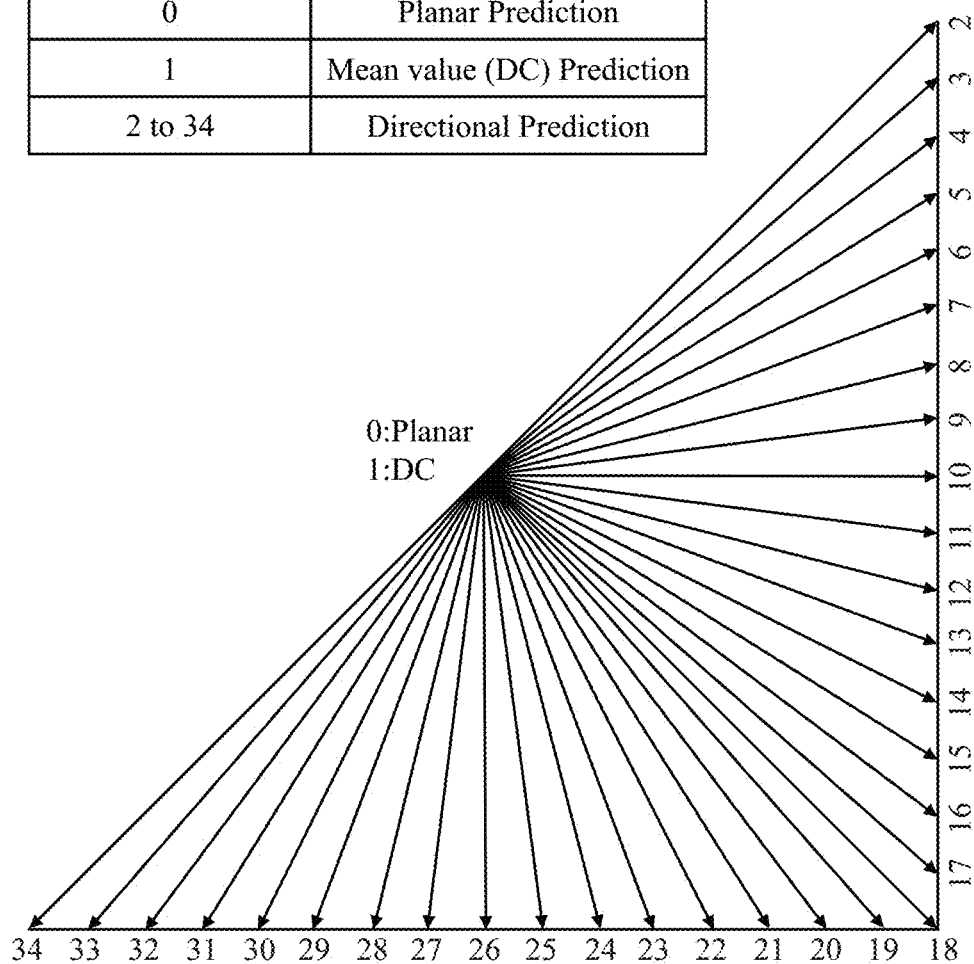
FIG. 7 is an explanatory drawing showing an example of an intra prediction intra prediction mode which can be selected for each prediction block $P_i^n$ in a coding block B"

FIG. 7 is an explanatory drawing showing an example of intra prediction modes each of which can be selected for each prediction block $P_i^n$ in the coding block $B^n$, and shows the index values of the intra prediction modes and prediction direction vectors respectively indicated by the intra prediction modes. The index value of each of the above-described intra prediction modes indicates the intra prediction parameter.

The number of intra prediction modes can be configured to differ according to the size of the block which is the target for processing.

By providing a configuration in which the number of intra prediction directions which can be selected is made to be small for a block having a larger size because the efficiency of intra prediction is reduced whereas the number of intra prediction directions which can be selected is made to be large for a block having a smaller size, the amount of computations can be suppressed.

First, because the process of generating an intra prediction image employs an already-encoded pixel adjacent to the block which is the target for processing, the process must be performed on a per transformation block basis, as mentioned above.

Hereafter, a transformation block for which an intra prediction image is to be generated is referred to as a prediction image generation block. Therefore, the intra prediction unit 4 performs an intra prediction image generating process, which will be mentioned blow, on a per prediction image generation block basis, to generate an intra prediction image of the prediction block $P_i^n$.

It is assumed that the size of a prediction image generation block is $l_i^n \times m_i^n$ pixels.

Figure 8:
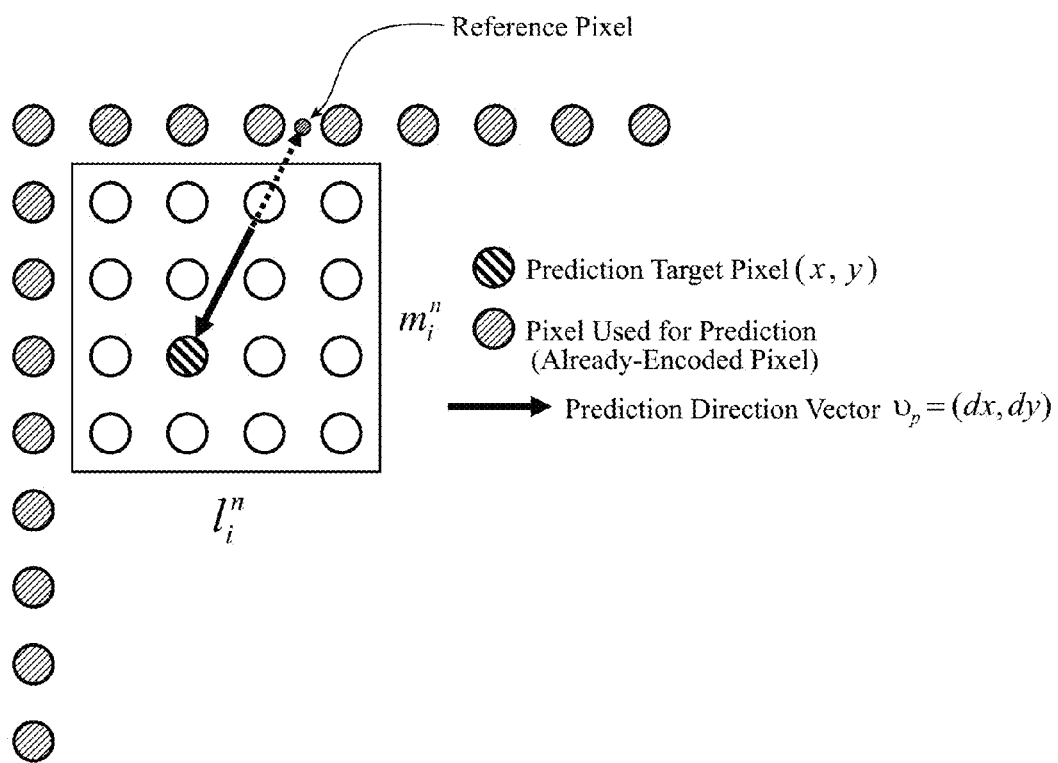
FIG. 8 is an explanatory drawing showing an example of pixels which are used when generating a predicted value of each pixel in a prediction image generation block in the case of $l_i^n = m_i^n = 4$.

FIG. 8 is an explanatory drawing showing an example of pixels which are used when generating a predicted value of each pixel in the prediction image generation block in the case of $l_i^n = m_i^n = 4$.

Although $(2 \times l_i^n + 1)$ already-encoded pixels located on the top of the prediction image generation block and $(2 \times m_i^n)$ already-encoded pixels located to the left of the prediction image generation block are set as the pixels used for prediction in the example of FIG. 8, the number of pixels used for prediction can be larger or smaller than that of the pixels shown in FIG. 8.

Further, although one row or column of pixels adjacent to the prediction image generation block are used for prediction in the example shown in FIG. 8, two or more rows or columns of pixels can be alternatively used for prediction.

When the index value indicating the intra prediction mode for the prediction block $P_i^n$ to which the prediction image generation block belongs is 0 (planar prediction), by using already-encoded pixels adjacent to the top of the prediction image generation block and already-encoded pixels adjacent to the left of the prediction image generation block, the intra prediction unit determines a value interpolated according to the distances between these pixels and the target pixel for prediction in the prediction image generation block as a predicted value and generates a prediction image.

When the index value indicating the intra prediction mode for the prediction block $P_i^n$ to which the prediction image generation block belongs is 1 (mean value (DC) prediction), the intra prediction unit determines the mean value of the already-encoded pixels adjacent to the top of the prediction image generation block and the already-encoded pixels adjacent to the left of the prediction image generation block as the predicted value of each pixel in the prediction image generation block and generates a prediction image.

Figure 17:
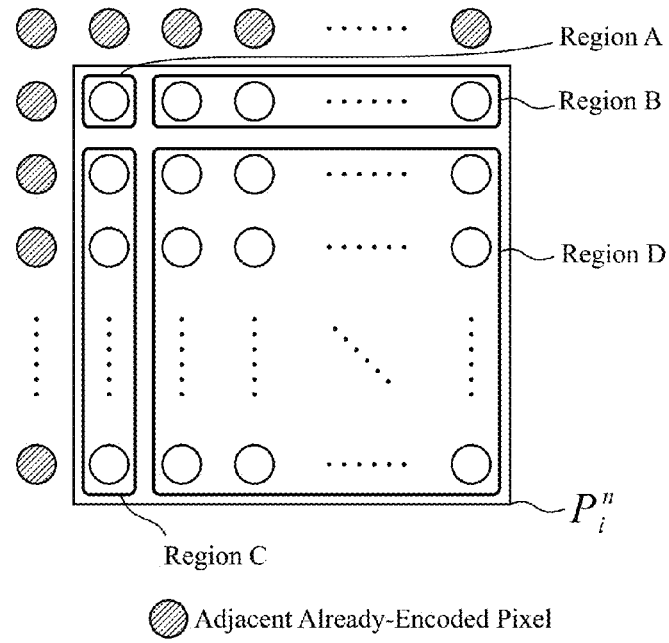
FIG. 17 is an explanatory drawing showing regions for which switching of filters is performed in a filtering process at the time of a mean value prediction.
Figure 18:
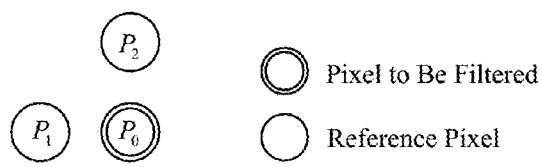
FIG. 18 is an explanatory drawing showing the arrangement of reference pixels in the filtering process at the time of the mean value prediction.

In addition, a filtering process of smoothing a block boundary is performed on regions A, B, and C shown in FIG. 17 located at the upper edge and at the left edge of the prediction image generation block, and a final prediction image is generated. For example, in the case of the arrangement, as shown in FIG. 18, of reference pixels of the filter, according to the following equation (1), the filtering process is performed by using the following filter coefficients.

$$S'(p_0) = a_0 S(p_0) + a_1 S(p_1) + a_2 S(p_2) \quad (1)$$

Region A (the pixel at the upper left corner of the partition $P_i^n$)
$a_0 = 1/2$, $a_1 = 1/4$, $a_2 = 1/4$
Region B (the pixels at the upper edge of the partition $P_i^n$, except the region A)
$a_0 = 3/4$, $a_2 = 1/4$, $(a_1 = 0)$
Region C (the pixels at the left edge of the partition $P_i^n$, except the region A)
$a_0 = 3/4$, $a_1 = 1/4$, $(a_2 = 0)$ In the equation (1), $a_n$ (n=0, 1, 2) denotes the filter coefficient by which each reference pixel is multiplied, $p_n$ (n=0, 1, 2) denotes each reference pixel of the filter, including the target pixel $p_0$ for filtering process, $S'(p_0)$ denotes the predicted value after the filtering process in the target pixel $p_0$ for filtering process, and $S(p_n)$ (n=0, 1, 2) denotes the predicted value before the filtering process of each reference pixel including the target pixel $p_0$ for filtering process.

In addition, the block size of the prediction image generation block on which the above-described filtering process is to be performed can be limited.

In general, because when the filtering process is performed only on a block edge to change the predicted value, a block having a large block size has a small ratio of occupation of a region in which the predicted value varies due to the filtering process, a change of a prediction residual signal which is caused by this variation in the predicted value is expressed by a very high frequency component, and there is a tendency that degradation of the coding efficiency is caused because of the encoding of this high frequency component. Further, when preventing this high frequency component from being encoded while giving a priority to the coding efficiency, there is a tendency that a change of the prediction residual signal of a block edge cannot be restored and a distortion is caused at a block boundary.

On the other hand, because a block having a small block size has a large ratio of occupation of a region in which the predicted value varies due to the filtering process, a change of the prediction residual signal which is caused by this variation in the predicted value is not expressed by such a high frequency component as mentioned at the time of a block having a large block size, and the residual signal can be encoded appropriately and the quality of the decoded image can be improved by such an extent that the continuity of a block boundary is improved by using this filtering process.

Accordingly, for example, by, instead of applying the above-described filtering process to prediction image generation blocks having a block size of 32×32 pixels or more, applying the above-described filtering process only to blocks having a size smaller than 32×32 pixels, increase in the amount of computations can be suppressed while improving the prediction performance as compared with that of the conventional mean value prediction.

In addition, the block size of the prediction image generation block on which the above-described filtering process is to be performed can be limited according to the transformation block size.

For example, the above-described filtering process is not applied to prediction image generation blocks each having a block size equal to or larger than max(16, MaxTUsize), but the above-described filtering process is applied only to blocks each having a size smaller than max(16, MaxTUsize).

max($\alpha$, $\beta$) shows the maximum of $\alpha$ and $\beta$ (e.g., when $\alpha$=1 and $\beta$=2, max($\alpha$, $\beta$)=2), "MaxTUsize" shows the largest transformation block size which each transformation block can have, and "16" shows a predetermined block size (16×16 pixels).

More specifically, in the case of not applying the above-described filtering process to prediction image generation blocks each having a block size equal to or larger than max(16, MaxTUsize), but applying the above-described filtering process only to blocks each having a size smaller than max(16, MaxTUsize), when MaxTUsize is 32, max(16, 32)=32 and therefore the prevention of the application of the above-described filtering process is performed only on 32×32 pixel blocks while the above-described filtering process is performed on 16×16 pixel blocks, 8×8 pixel blocks, and 4×4 pixel blocks.

Similarly, when MaxTUsize is 16, max(16, 16)=16, and therefore the prevention of the application of the above-described filtering process is performed only on 16×16 pixel blocks while the above-described filtering process is performed on 8×8 pixel blocks and 4×4 pixel blocks.

In addition, when MaxTUsize is 8, max(16, 8)=16, and therefore the prevention of the application of the above-described filtering process is performed only on 16×16 pixel blocks while the above-described filtering process is performed on 8×8 pixel blocks and 4×4 pixel blocks. Therefore, when MaxTUsize is 8 at which no 16×16 pixel block exists, the above-described filtering process is performed on all the pixel blocks (8×8 and 4×4).

Similarly, when MaxTUsize is 4, max(16, 4)=16, and therefore the prevention of the application of the above-described filtering process is performed only on 16×16 pixel blocks while the above-described filtering process is performed on 8×8 pixel blocks and 4×4 pixel blocks. Therefore, when MaxTUsize is 4 at which only 4×4 pixel blocks exist, the above-described filtering process is performed on all the pixel blocks (4×4).

By doing in this way, because an orthogonal transformation process with as large a size as possible is typically performed on, for example, a flat region, such as a "sky" region when performing efficient encoding, a transformation process with a block size of MaxTUsize is performed on such a region.

On the other hand, because there is a tendency that in such a large block, the filtering process causes a distortion at a block boundary of the decoded image, as described above, the filtering process is prevented from being performed on a flat portion in which the sensitivity is particularly high as a human being's visual sense characteristic, in order to suppress such a distortion, and the above-described filtering process is performed on a block having a small block size, such as a complicated region in which there is a tendency that a reduction of the block size makes it possible to perform the encoding efficiently, so that there is provided an advantage of improving the prediction efficiency and improving the quality of the decoded image.

Figure 19:
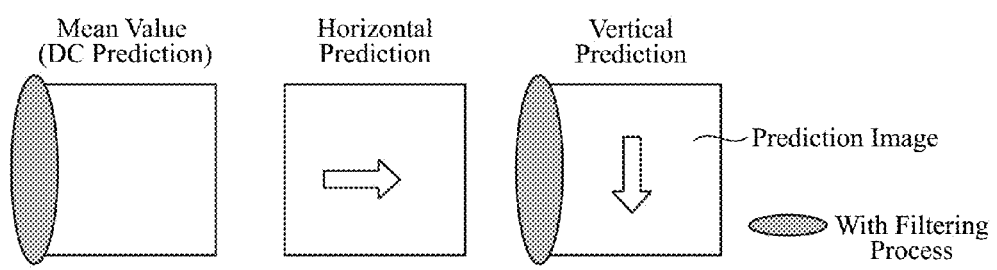
FIG. 19 is an explanatory drawing showing a filtering process on an intra prediction image at the time of field encoding.

In addition, when a flag showing whether or not the field encoding is performed is provided for each sequence level header and the above-described flag is valid, the filtering process is not performed on the upper edge of the prediction image generation block, as shown in FIG. 19.

In the case of the field encoding, there is a possibility that because the correlation between pixels in the vertical direction is low, the prediction efficiency gets worse due to the filtering process on the upper edge of the prediction image generation block. Therefore, by performing the filtering process only on the regions A and C, and preventing the filtering process from being performed on the region B, the amount of computations can be reduced while a reduction of the prediction efficiency is prevented.

Although in the above-described example, the filtering process is performed only on the regions A and C when the flag of a sequence level header showing whether or not the field encoding is performed is valid, the same filtering process as that on the region C can be performed also on the region A. Thus, by not using pixels in the vertical direction having a low correlation between the pixels, the possibility of reduction of the prediction efficiency can be further lowered while the amount of computations required for the filtering process can be reduced. As an alternative, when attaching importance to a further reduction of the amount of computations, no filtering process can be performed also on the region A and the filtering process can be performed only on the region C.

When the index value indicating the intra prediction mode for the prediction block $P_i^n$ to which the prediction image generation block belongs is 26 (vertical prediction), the intra prediction unit calculates the predicted value of each pixel in the prediction image generation block according to the following equation (2), and generates a prediction image.

$$S'(x, y) = \begin{cases} S(x, -1) + (S(-1, y) - S(-1, -1)) \gg 1 & (x \le 0) \\ S(x, -1) & (x > 0) \end{cases} \quad (2)$$

In this equation, coordinates (x, y) are relative coordinates (refer to FIG. 9) acquired with the pixel at the upper left corner in the prediction image generation block being defined as the point of origin, S'(x, y) is the predicted value at the coordinates (x, y), and S(x, y) is the luminance value (decoded luminance value) of the already-encoded pixel at the coordinates (x, y). Further, when the calculated predicted value exceeds a range of values which the luminance value can have, the predicted value is rounded in such a way as to fall within the range.

An expression in the first line of the equation (2) means that by adding a value which is one-half of the amount of change (S (−1, y)−S (−1, −1)) in the vertical direction of the luminance values of adjacent already-encoded pixels to S (x, −1) which is the predicted value acquired by the vertical prediction in MPEG-4 AVC/H.264, the filtering process is performed in such a way that a block boundary is smoothed, and an expression in the second line of the equation (2) shows the same prediction expression as that for the vertical prediction in MPEG-4 AVC/H.264.

When the index value indicating the intra prediction mode for the prediction block $P_i''$ to which the prediction image generation block belongs is 10 (horizontal prediction), the intra prediction unit calculates the predicted value of each pixel in the prediction image generation block according to the following equation (3), and generates a prediction image.

$$S'(x, y) = \begin{cases} S(-1, y) + (S(x, -1) - S(-1, -1)) >> 1 & (y \leq 0) \\ S(-1, y) & (y > 0) \end{cases} \quad (3)$$

In this equation, coordinates (x, y) are relative coordinates (refer to FIG. 9) acquired with the pixel at the upper left corner in the prediction image generation block being defined as the point of origin, S'(x, y) is the predicted value at the coordinates (x, y), and S(x, y) is the luminance value (decoded luminance value) of the already-encoded pixel at the coordinates (x, y). Further, when the calculated predicted value exceeds a range of values which the luminance value can have, the predicted value is rounded in such a way as to fall within the range.

An expression in the first line of the equation (3) means that by adding a value which is one-half of the amount of change (S(x, −1)−S(−1, −1)) in the horizontal direction of the luminance values of adjacent already-encoded pixels to S(−1, y) which is the predicted value acquired by the horizontal prediction in MPEG-4 AVC/H.264, the filtering process is performed in such a way that a block boundary is smoothed, and an expression in the second line of the equation (3) shows the same prediction expression as that for the horizontal prediction in MPEG-4 AVC/H.264.

The block size of the prediction image generation block on which the vertical prediction according to the equation (2) and the horizontal prediction according to the equation (3) are to be performed can be limited.

In general, because when a filtering process of adding a value proportional to the amount of change of the luminance value in the prediction direction is performed only on a block edge so as to change the predicted value, a block having a large block size has a small ratio of occupation of a region in which the predicted value varies due to the above-described filtering process on the block edge of the prediction image generation block, a change of the prediction residual signal which is caused by this variation in the predicted value is expressed by a very high frequency component, and there is a tendency that degradation of the coding efficiency is caused because of encoding of this high frequency component. Further, when preventing this high frequency component from being encoded while giving a priority to the coding efficiency, there is a tendency that a change of the prediction residual signal of a block edge cannot be restored and a distortion is caused at a block boundary.

On the other hand, because a block having a small block size has a large ratio of occupation of a region in which the predicted value varies due to the filtering process, a change of the prediction residual signal which is caused by this variation in the predicted value is not expressed by such a high frequency component as mentioned at the time of a block having a large block size, and the residual signal can be encoded appropriately and the quality of the decoded image can be improved by such an extent that the continuity of a block boundary is improved by using this filtering process.

Accordingly, for example, by, for a prediction image generation block having a block size of 32×32 pixels or more, always using the expressions in the second lines of the equations (2) and (3) regardless of the coordinates of the target pixel for prediction (not performing the filtering process on the block edges of the prediction image generation block), and applying the equations (2) and (3) according to which the above-described filtering process is performed only to blocks having a size smaller than 32×32 pixels, increase in the amount of computation can be suppressed while improving the prediction performance as compared with those of the conventional vertical and horizontal predictions.

In addition, the block size of the prediction image generation block on which the vertical prediction according to the equation (2) and the horizontal prediction according to the equation (3) are to be performed can be limited according to the transformation block size.

For example, for a prediction image generation block each having a block size equal to or larger than max(16, MaxTUsize), the expressions in the second lines of the equations (2) and (3) are always used regardless of the coordinates of the target pixel for prediction (the filtering process on the block edges of the prediction image generation block is not performed), and the equations (2) and (3) according to which the above-described filtering process is performed are applied only to blocks each having a size smaller than max(16, MaxTUsize).

max(α, β) shows the maximum of α and β (e.g., when α=1 and β=2, max(α, β)=2), "MaxTUsize" shows the largest transformation block size which each transformation block can have, and "16" shows the predetermined block size (16×16 pixels).

More specifically, in the case of not applying the above-described filtering process to prediction image generation blocks each having a block size equal to or larger than max(16, MaxTUsize), but applying the above-described filtering process only to blocks each having a size smaller than max(16, MaxTUsize), when MaxTUsize is 32, max(16, 32)=32 and therefore the prevention of the application of the above-described filtering process is performed only on 32×32 pixel blocks while the above-described filtering process is performed on 16×16 pixel blocks, 8×8 pixel blocks, and 4×4 pixel blocks.

Similarly, when MaxTUsize is 16, max(16, 16)=16, and therefore the prevention of the application of the above-described filtering process is performed only on 16×16 pixel blocks while the above-described filtering process is performed on 8×8 pixel blocks and 4×4 pixel blocks.

In addition, when MaxTUsize is 8, max(16, 8)=16, and therefore the prevention of the application of the above-described filtering process is performed only on 16×16 pixel blocks while the above-described filtering process is performed on 8×8 pixel blocks and 4×4 pixel blocks. Therefore, when MaxTUsize is 8 at which no 16×16 pixel block exists, the above-described filtering process is performed on all the pixel blocks (8×8 and 4×4).

Similarly, when MaxTUsize is 4, max(16, 4)=16, and therefore the prevention of the application of the above-described filtering process is performed only on 16×16 pixel blocks while the above-described filtering process is performed on 8×8 pixel blocks and 4×4 pixel blocks. Therefore, when MaxTUsize is 4 at which only 4×4 pixel blocks exist, the above-described filtering process is performed on all the pixel blocks (4×4).

By doing in this way, because an orthogonal transformation process with as large a size as possible is typically performed on a flat region, such as a "sky" region, for example, when performing efficient encoding, a transformation process with a block size of MaxTUsize is performed on such a region.

On the other hand, because there is a tendency that in such a large block, the filtering process causes a distortion at a block boundary of the decoded image, as mentioned above, the filtering process is prevented from being performed on a flat portion in which its sensitivity is particularly high as a human being's visual sense characteristic, in order to suppress such a distortion, and, by performing the above-described filtering process on a block having a small block size, such as a complicated region in which there is a tendency that reduction of the block size makes it possible to perform the encoding efficiently, there is provided an advantage of improving the prediction efficiency and improving the quality of the decoded image.

Although the above-described operation is explained as to the case of the mean value prediction, the case of the horizontal prediction, and the case of the vertical prediction, the same advantages can be provided also when a prediction other than these predictions is used.

In addition, when the flag showing whether or not the field encoding is performed is provided for each sequence level header and the above-described flag is valid, an equation (4) is used, instead of the equation (3), for the horizontal prediction.

$$S'(x,y) = S(-1,y) \quad (4)$$

More specifically, the filtering process is prevented from being performed on the upper edge of the prediction image generation block (in the case of the mean value prediction and the vertical prediction, the filtering process is performed only on the left edge of the prediction image generation block, whereas in the case of the horizontal prediction, the filtering process is not performed), as shown in FIG. 19.

In the case of the field encoding, there is a possibility that because the correlation between pixels in the vertical direction is low, the prediction efficiency gets worse due to an improvement of the continuity of a block boundary which is caused by the filtering process on the upper edge of the prediction image generation block. Accordingly, by not performing the above-described filtering process, the amount of computations can be reduced while a reduction of the prediction efficiency is prevented.

The flag of a sequence level header showing whether or not the field encoding is performed can be prepared in each picture level header, and the ON/OFF switching of the filtering process on the upper edge of the prediction image generation block in the mean value (DC) prediction and in the horizontal prediction can be performed according to the correlation between pixels in the vertical direction of each picture.

By doing in this way, adaptive control on a per picture basis can be implemented, and the coding efficiency can be improved. It is necessary to prepare the above-described flag in each picture level header when implementing the encoding of adaptively switching between the frame encoding and the field encoding on a per picture basis.

Further, although the case in which the ON/OFF of the filtering process on the upper edge of the prediction image generation block is switched on the basis of the flag of a sequence level header or a picture level header showing whether or not the field encoding is performed is explained in this Embodiment 1, a flag showing whether or not this switching process is performed can be defined independently from the flag of a sequence level header or a picture level header showing whether or not the field encoding is performed, and the ON/OFF of the filtering process on the upper edge of the prediction image generation block can be switched on the basis of this flag showing whether or not the switching process is performed.

Further, although the changing of the encoding order explained previously and the above-described switching of the filtering process are explained separately in this Embodiment 1, these processes can be combined and configured.

When the index value indicating an intra prediction mode is other than 0 (planar prediction), 1 (mean value prediction), 26 (vertical prediction), and 10 (horizontal prediction), the intra prediction unit generates the predicted value of each pixel in the prediction image generation block on the basis of the prediction direction vector $u_p = (dx, dy)$ indicated by the index value.

As shown in FIG. 9, when the relative coordinates of each pixel in the prediction image generation block are expressed as (x, y) with the pixel at the upper left corner of the prediction image generation block being defined as the point of origin, each reference pixel which is used for prediction is located at a point of intersection of L shown below and an adjacent pixel.

$$L = \begin{pmatrix} x \\ y \end{pmatrix} + k v_p \quad (5)$$

where k is a negative real number.

When a reference pixel is at an integer pixel position, the value of the corresponding integer pixel is determined as the predicted value of the target pixel to be predicted, whereas when a reference pixel is not at an integer pixel position, the value of an interpolation pixel generated from the integer pixels which are adjacent to the reference pixel is determined as the predicted value.

In the example shown in FIG. 8, because a reference pixel is not located at an integer pixel position, the predicted value is interpolated from the values of two pixels adjacent to the reference pixel. The intra prediction unit can use, instead of only the adjacent two pixels, adjacent two or more pixels to generate an interpolation pixel and determine the value of this interpolation pixel as the predicted value.

While the increase in the number of pixels used for the interpolation process provides an advantage of improving the accuracy of interpolation of an interpolation pixel, because the degree of complexity of computations required for the interpolation process increases, it is preferable to generate an interpolation pixel from a larger number of pixels in a case in which the color image encoding device requires high encoding performance even if the arithmetic load is large.

Through the process described above, the intra prediction unit generates prediction pixels for all the pixels of the luminance signal in the prediction block $P_i^n$ on a per prediction image generation block basis, and outputs an intra prediction image $P_{INTRAi}^n$.

The intra prediction parameter (intra prediction mode) used for the generation of the intra prediction image $P_{INTRAi}^n$ is outputted to the variable length encoding unit 13 in order to multiplex the intra prediction parameter into the bitstream.

Like in the case of performing a smoothing process on a reference pixel at the time of performing an intra prediction on an 8×8-pixel block in MPEG-4 AVC/H.264 explained previously, even if the intra prediction unit 4 is configured in such a way that an already-encoded pixel adjacent to the prediction image generation block on which a smoothing process is performed is provided as the reference pixel at the time of generating a prediction image of the prediction image generation block, the filtering process which is the same as that in the above-described example can be performed on the prediction image. By doing in this way, the noise of the reference pixel which is caused by the filtering process on the reference pixel can be removed, and the accuracy of the prediction can be improved by performing the prediction by using this configuration.

As an alternative, the above-described filtering process on the reference pixel can be configured to be performed only at the time of a prediction including the step of performing the filtering process on the prediction image, other than the mean value prediction, the vertical prediction, and the horizontal prediction. By doing in this way, the intra prediction unit has only to perform one filtering process at the maximum for each prediction mode, and the increase in the amount of computations can be suppressed.

Although the process of generating a prediction image of the luminance signal is explained above, prediction images for the chrominance components are generated as follows.

The intra prediction unit performs an intra prediction process based on the intra prediction parameter (intra prediction mode) of the chrominance signals on the chrominance signals of the prediction block $P_i^n$, and outputs the intra prediction parameter used for the generation of the intra prediction image to the variable length encoding unit 13.

FIG. 23 is an explanatory drawing showing an example of a correspondence between the intra prediction parameter (index value) and a chrominance intra prediction mode of the chrominance signals.

When the intra prediction parameter of the chrominance signals shows that the same prediction mode as the intra prediction mode for the luminance signal is used (when the intra prediction parameter shows the intra prediction mode common between luminance and chrominances (DM mode)), the intra prediction unit performs the same intra-frame prediction as that on the luminance signal to generate prediction images of the chrominance signals.

Further, when the intra prediction parameter of the chrominance signals shows the vertical prediction mode or the horizontal prediction mode, the intra prediction unit performs a directional prediction on the chrominance signals to generate prediction images of the chrominance signals.

Further, when the intra prediction parameter of the chrominance signals shows the chrominance signal prediction mode using a luminance correlation (LM mode), the intra prediction unit calculates a correlation parameter showing the correlation between the luminance signal and the chrominance signals by using the luminance signals and the chrominance signals of a plurality of pixels adjacent to the upper and left sides of a block for which a prediction image is to be generated, and generates prediction images of the chrominance signals by using both the correlation parameter and the luminance signal associated with the block of each of the chrominance signals which is the target for prediction process.

The intra prediction unit can be configured to, when the input signal format is the YUV4:4:4 signal format, perform a process in either the above-described DM mode or the above-described LM mode, and prevent itself from selecting another prediction mode. Because there is a high correlation between the edge position of the luminance signal and those of the chrominance signals in a YUV4:4:4 signal, by prohibiting the application of a prediction mode different from that applied to the luminance signal to the chrominance signals, the amount of information in the intra prediction mode of the chrominance signals can be reduced and the coding efficiency can be improved.

As a matter of course, the intra prediction unit can be configured to select, for the chrominance signals, a directional prediction mode different from that for the luminance signal also in the case of a YUV4:4:4 signal.

Further, when the input signal format is the YUV4:2:2 signal format, if the luminance signal is a square block, as shown in FIG. 27, each of the chrominance signals is a rectangular block in which the number of pixels in the horizontal direction is half as compared with that of the luminance signal. Therefore, in order to apply a prediction in the same direction to the luminance signal and the chrominance signals when a YUV4:4:4 signal is converted into a YUV4:2:2 signal, as shown in FIG. 28, the prediction direction of the chrominance signals is configured to differ from that of the luminance signal on the YUV4:2:2 signal in the case of a directional prediction other than the vertical prediction and the horizontal prediction.

Concretely, when the prediction direction vector of the luminance signal is expressed by $v_L=(dx_L, dy_L)$, as shown in FIG. 29, the prediction direction vector of each of the chrominance signals is expressed by $v_C=(dx_L/2, dy_L)$. More specifically, when the angle of the prediction direction is expressed by θ, as shown in FIG. 30, it is necessary to perform a prediction in a prediction direction having a relation shown by $\tan \theta_C = 2 \tan \theta_L$, where the angle of the prediction direction of the luminance signal is expressed by $\theta_L$ and the angle of the prediction direction of each of the chrominance signals is expressed by $\theta_C$.

Therefore, when the input signal format is the YUV4:2:2 signal format, at the time of performing the above-described DM mode, the intra prediction unit converts an index of the intra prediction mode which is used for the luminance signal into an index of the intra prediction mode which is used for the prediction on the chrominance signals, and performs the prediction process on the chrominance signals in the intra prediction mode corresponding to the index after conversion.

FIG. 31 shows an example of the conversion of the intra prediction mode index in the intra prediction mode of FIG. 7.

The conversion table of FIG. 31 is an example of a table for performing conversion into an angle $\theta_C$ which is the closest to the following relation: $\tan \theta_C = 2 \tan \theta_L$ in the case of an angle at which the directional prediction in the intra prediction mode is given by tan θ shown in FIG. 32, where the angle of the prediction direction is expressed by θ (refer to FIG. 30).

The implementation of the conversion process can be configured in such a way that the conversion table for the index is prepared and the intra prediction unit converts the index by referring to the conversion table, as described above, or a conversion equation is prepared and the intra prediction unit converts the index according to the conversion equation.

By configuring the intra prediction unit in this way, the intra prediction unit can perform an appropriate prediction on the chrominance signals according to the YUV4:2:2 signal format only by performing the conversion of the index without changing the directional prediction process itself.

Further, the intra prediction unit can be configured in such a way as to prevent itself from performing the above-described LM mode on the chrominance signals. As an example of the correspondence between the intra prediction parameter (index value) and the chrominance intra prediction mode of the chrominance signals at that time, an example of FIG. 24 is provided.

Because by thus configuring the intra prediction unit in such a way as not to use the LM mode as well, the dependence between the luminance signal and the chrominance signals of the target pixel for prediction is eliminated, parallelization of the prediction process on the luminance signal and that on the chrominance signals is enabled, and high-speed arithmetic processing can be implemented.

In addition, as to the vertical prediction and the horizontal prediction on the chrominance signals, the same prediction method as that in MPEG-4 AVC/H.264 can be used without performing the filtering process on a block boundary. By not performing the filtering process in this way, a reduction of the amount of computations of the prediction process can be achieved.

Next, the processing performed by the color image decoding device shown in FIG. 3 will be explained concretely.

When receiving the encoded bitstream generated by the color image encoding device shown in FIG. 1, the variable length decoding unit 31 performs the variable length decoding process on the bitstream (step ST21 of FIG. 4), and decodes the header information (sequence level header) about each sequence which consists of one or more frames of pictures and the header information (picture level header) about each picture, the filter parameter for use in the loop filter unit 38, and the quantization matrix parameter.

At that time, when the enable flag information of the quantization matrix included in the above-described header information shows "enabled", the variable length decoding unit 31 variable-length-decodes the quantization matrix parameter to specify the quantization matrix.

Concretely, for each chrominance signal and for each coding mode at each orthogonal transformation size, when the quantization matrix parameter shows that either a quantization matrix which is prepared, as an initial value, in advance and in common between the color image encoding device and the color image decoding device, or an already-decoded quantization matrix is used (no new quantization matrix is used), the color image decoding device refers to the index information included in the quantization matrix parameter and specifying which quantization matrix in the above-described matrices is used, to specify the quantization matrix, and, when the quantization matrix parameter shows that a new quantization matrix is used, specifies, as the quantization matrix to be used, the quantization matrix included in the quantization matrix parameter.

The color image decoding device then decodes the header information about each slice (slice level header), such as the slice partitioning information, from each slice data which constructs the data about each picture, and decodes the encoded data about each slice.

The variable length decoding unit 31 also determines the largest coding block size and the upper limit on the number of hierarchical layers partitioned which are determined by the encoding controlling unit 2 of the color image encoding device shown in FIG. 1 according to the same procedure as that of the color image encoding device (step ST22).

For example, when the largest coding block size and the upper limit on the number of hierarchical layers partitioned are determined according to the resolution of the video signal, the variable length decoding unit determines the largest coding block size on the basis of the decoded frame size information and according to the same procedure as that of the color image encoding device.

When the largest coding block size and the upper limit on the number of hierarchical layers partitioned are multiplexed into the sequence level header or the like by the color image encoding device, the values decoded from the above-described header are used. When the smallest block size of the coding blocks, instead of the upper limit on the number of hierarchical layers partitioned, is encoded, the upper limit on the number of hierarchical layers partitioned is determined by decoding this size. More specifically, the number of hierarchical layers in the case of partitioning each largest coding block into blocks having the above-described smallest block size is the upper limit on the number of hierarchical layers partitioned.

The variable length decoding unit 31 decodes the partitioning state of a largest coding block as shown in FIG. 6 for each determined largest coding block. On the basis of the decoded partitioning state, the variable length decoding unit specifies coding blocks hierarchically (step ST23).

The variable length decoding unit 31 then decodes the coding mode assigned to each coding block. The variable length decoding unit further partitions each coding block into one or more prediction blocks each of which is a unit for prediction process on the basis of the information included in the decoded coding mode, and decodes the prediction parameter assigned to each of the one or more prediction blocks (step ST24).

More specifically, when the coding mode assigned to a coding block is an intra coding mode, the variable length decoding unit 31 decodes the intra prediction parameter for each of the one or more prediction blocks which are included in the coding block and each of which is a unit for prediction process.

In contrast, when the coding mode assigned to a coding block is an inter coding mode, the variable length decoding unit decodes the inter prediction parameter and the motion vector for each of the one or more prediction blocks which are included in the coding block and each of which is a unit for prediction process (step ST24).

The variable length decoding unit 31 further decodes the compressed data (transformed and quantized transform coefficients) for each transformation block on the basis of the transformation block partitioning information included in the prediction difference coding parameters (step ST24).

At that time, the variable length decoding unit performs a process of decoding the coefficients of each CG in the same way that the variable length encoding unit 13 of the color image encoding device shown in FIG. 1 performs the process of encoding the compressed data.

Therefore, as shown in FIG. 15, the variable length decoding unit performs a process of decoding 16 CGs of 4×4 pixels in order from the CG at the lower right corner, and further decodes the 16 coefficients in each CG in order from the coefficient at the lower right corner.

Concretely, the flag information showing whether a significant (non-zero) coefficient exists in the 16 coefficients in the CG is decoded first, whether or not each coefficient in the CG is a significant (non-zero) coefficient is then decoded in the above-described order only when the decoded flag information shows that a significant (non-zero) coefficient exists in the CG, and, for each coefficient showing a significant (non-zero) coefficient, information about the coefficient value is finally decoded in order. This process is performed in the above-described order on a per CG basis.

When the coding mode m(B″) variable-length-decoded by the variable length decoding unit 31 is an intra coding mode (when m(B″)∈INTRA), the select switch 33 outputs the intra prediction parameter of each prediction block, which is variable-length-decoded by the variable length decoding unit 31, to the intra prediction unit 34.

In contrast, when the coding mode m(B″) variable-length-decoded by the variable length decoding unit 31 is an inter coding mode (when m(B″)∈INTER), the select switch outputs the inter prediction parameter and the motion vector of each prediction block, which are variable-length-decoded by the variable length decoding unit 31, to the motion compensation unit 35.

When the coding mode m(B″) variable-length-decoded by the variable length decoding unit 31 is an intra coding mode (m(B″)∈INTRA) (step ST25), the intra prediction unit 34 receives the intra prediction parameter of each prediction block outputted from the select switch 33, and performs an intra prediction process on each prediction block $P_i''$ in the coding block B″ using the above-described intra prediction parameter while referring to the decoded image stored in the memory 37 for intra prediction, to generate an intra prediction image $P_{INTRAi}''$, according to the same procedure as that of the intra prediction unit 4 shown in FIG. 1 (step ST26).

When the flag showing whether or not the field encoding is performed is provided for the sequence level header decoded by the variable length decoding unit 31 and the above-described flag is valid, the filtering process is prevented from being performed on the upper edge of the prediction image generation block in the mean value (DC) prediction and in the horizontal prediction, like in the case of the color image encoding device shown in FIG. 1. By doing in this way, the same prediction image as that of the stream generated by the color image encoding device shown in FIG. 1 can be generated.

When the flag of a sequence level header showing whether or not the field encoding is performed is prepared in each picture level header in the color image encoding device shown in FIG. 1, according to the value of this flag, in each picture level header, showing whether or not the field encoding is performed, the ON/OFF switching of the filtering process on the upper edge of each prediction image generation block in the mean value (DC) prediction and in the horizontal prediction is performed on a per picture basis.

By doing in this way, the same prediction image as that of the bitstream generated by the color image encoding device of FIG. 1 which is configured in the above-described way can be generated.

Further, as to the luminance signal, the intra prediction unit 34 performs the intra prediction process (intra-frame prediction process) using the above-described intra prediction parameter on the luminance signal, to generate a prediction image of the luminance signal.

On the other hand, as to the chrominance signals, the intra prediction unit performs the intra prediction process based on the intra prediction parameter of the chrominance signals, to generate prediction images of the chrominance signals.

FIG. 23 is an explanatory drawing showing an example of a correspondence between the intra prediction parameter (index value) and a chrominance intra prediction mode of the chrominance signals.

When the intra prediction parameter of the chrominance signals shows that the same prediction mode as the intra prediction mode for the luminance signal is used (when the intra prediction parameter shows the intra prediction mode common between luminance and chrominances (DM mode)), the intra prediction unit performs the same intra-frame prediction as that on the luminance signal to generate prediction images of the chrominance signals.

Further, when the intra prediction parameter of the chrominance signals shows the vertical prediction mode or the horizontal prediction mode, the intra prediction unit performs a directional prediction on the chrominance signals to generate prediction images of the chrominance signals.

Further, when the intra prediction parameter of the chrominance signals shows the chrominance signal prediction mode using a luminance correlation (LM mode), the intra prediction unit calculates a correlation parameter showing the correlation between the luminance signal and the chrominance signals by using the luminance signals and the chrominance signals of a plurality of pixels adjacent to the upper and left sides of a block for which a prediction image is to be generated, and generates prediction images of the chrominance signals by using both the correlation parameter and the luminance signal associated with the block of each of the chrominance signals which is the target for prediction process.

In a case in which the color image encoding device is configured in such a way as to perform the process in the above-described DM mode or the above-described LM mode and prevent itself from selecting another prediction mode when the input signal format is the YUV4:4:4 signal format, the color image decoding device is similarly configured in such a way as to be able to decode the bitstream generated by the color image encoding device.

Because there is a high correlation between the edge position of the luminance signal and those of the chrominance signals in a YUV4:4:4 signal, by prohibiting the application of a prediction mode different from that applied to the luminance signal to the chrominance signals, the amount of information in the intra prediction mode of the chrominance signals can be reduced and the coding efficiency can be improved.

Further, when the input signal format is the YUV4:2:2 signal format, if the luminance signal is a square block, as shown in FIG. 27, each of the chrominance signals is a rectangular block in which the number of pixels in the horizontal direction is half as compared with that of the luminance signal. Therefore, in order to apply a prediction in the same direction to the luminance signal and the chrominance signals when a YUV4:4:4 signal is converted into a YUV4:2:2 signal, as shown in FIG. 28, the prediction direction of the chrominance signals is configured to differ from that of the luminance signal on the YUV4:2:2 signal in the case of a directional prediction other than the vertical prediction and the horizontal prediction.

Concretely, when the prediction direction vector of the luminance signal is expressed by $v_L=(dx_L, dy_L)$, as shown in FIG. 29, the prediction direction vector of each of the chrominance signals is expressed by $v_C=(dx_L/2, dy_L)$. More specifically, when the angle of the prediction direction is expressed by θ, as shown in FIG. 30, it is necessary to perform a prediction in a prediction direction having a relation shown by $\tan \theta_C = 2 \tan \theta_L$, where the angle of the prediction direction of the luminance signal is expressed by $\theta_L$ and the angle of the prediction direction of each of the chrominance signals is expressed by $\theta_C$.

Therefore, when the input signal format is the YUV4:2:2 signal format, at the time of performing the above-described DM mode, the intra prediction unit converts an index of the intra prediction mode which is used for the luminance signal into an index of the intra prediction mode which is used for the prediction on the chrominance signals, and performs the prediction process on the chrominance signals in the intra prediction mode corresponding to the index after conversion.

FIG. 31 shows an example of the conversion of the intra prediction mode index in the intra prediction mode of FIG. 7.

The conversion table of FIG. 31 is an example of a table for performing conversion into an angle $\theta_C$ which is the closest to the following relation: $\tan \theta_C = 2 \tan \theta_L$ in the case of an angle at which the directional prediction in the intra prediction mode is given by $\tan \theta$ shown in FIG. 32, where the angle of the prediction direction is expressed by $\theta$ (refer to FIG. 30).

The implementation of the conversion process can be configured in such a way that the conversion table for the index is prepared and the intra prediction unit converts the index by referring to the conversion table, as described above, or a conversion equation is prepared and the intra prediction unit converts the index according to the conversion equation.

By configuring the intra prediction unit in this way, the intra prediction unit can perform an appropriate prediction on the chrominance signals according to the YUV4:2:2 signal format only by performing the conversion of the index without changing the directional prediction process itself.

Further, in the case in which the color image encoding device is configured in such a way as to prevent itself from performing the above-described LM mode on the chrominance signals, the color image decoding device is similarly configured in such a way as to be able to decode the bitstream generated by the color image encoding device.

As an example of the correspondence between the intra prediction parameter (index value) and the chrominance intra prediction mode of the chrominance signals at that time, an example of FIG. 24 is provided.

Because by thus configuring the intra prediction unit in such a way as not to use the LM mode as well, the dependence between the luminance signal and the chrominance signals of the target pixel for prediction is eliminated, parallelization of the prediction process on the luminance signal and that on the chrominance signals is enabled, and high-speed arithmetic processing can be implemented.

In addition, in the case in which the color image encoding device is configured in such a way as to, as to the vertical prediction and the horizontal prediction on the chrominance signals, use the same prediction method as that in MPEG-4 AVC/H.264 without performing the filtering process on a block boundary, the color image decoding device is similarly configured in such a way as to be able to decode the bitstream generated by the color image encoding device.

By not performing the filtering process in this way, a reduction of the amount of computations of the prediction process can be achieved.

When the coding mode m(B″) variable-length-decoded by the variable length decoding unit 31 is an inter coding mode (m(B″)∈INTER) (step ST25), the motion compensation unit 35 receives the motion vector and the inter prediction parameter of each prediction block which are outputted from the select switch 33, and performs an inter prediction process on each prediction block $P_i''$ in the coding block B″ using the motion vector and the inter prediction parameter while referring to the decoded image which is stored in the motion-compensated prediction frame memory 39 and on which the filtering process is performed, to generate an inter prediction image $P_{INTERi}''$ (step ST27).

When receiving the compressed data and the prediction difference coding parameters from the variable length decoding unit 31, the inverse quantization/inverse transformation unit 32 refers to the quantization parameter and the transformation block partitioning information which are included in the prediction difference coding parameters and inverse-quantizes the compressed data on a per transformation block basis according to the same procedure as that of the inverse quantization/inverse transformation unit 8 shown in FIG. 1.

At that time, the inverse quantization/inverse transformation unit refers to each header information variable-length-decoded by the variable length decoding unit 31, and, when this header information shows that the inverse quantization process is performed on the slice currently being processed by using the quantization matrix, performs the inverse quantization process by using the quantization matrix.

At that time, the inverse quantization/inverse transformation unit refers to each header information variable-length-decoded by the variable length decoding unit 31 to specify the quantization matrix to be used for each of the chrominance signals and for each coding mode (intra coding or inter coding) at each orthogonal transformation size.

The inverse quantization/inverse transformation unit 32 also performs an inverse orthogonal transformation process on the transform coefficients, which are the compressed data inverse-quantized thereby, on a per transformation block basis, to calculate a decoded prediction difference signal which is the same as the local decoding prediction difference signal outputted from the inverse quantization/inverse transformation unit 8 shown in FIG. 1 (step ST28).

The adding unit 36 adds the decoded prediction difference signal calculated by the inverse quantization/inverse transformation unit 32 and either the intra prediction image $P_{INTRAi}''$ generated by the intra prediction unit 34 or the inter prediction image $P_{INTERi}''$ generated by the motion compensation unit 35 to calculate a decoded image and output the decoded image to the loop filter unit 38, and also stores the decoded image in the memory 37 for intra prediction (step ST29).

This decoded image is a decoded image signal which is used at the time of subsequent intra prediction processes.

When completing the processes of steps ST23 to ST29 on all the coding blocks B″ (step ST30), the loop filter unit 38 performs a predetermined filtering process on the decoded image outputted from the adding unit 36, and stores the decoded image filtering-processed thereby in the motion-compensated prediction frame memory 39 (step ST31).

Concretely, the loop filter unit performs a filtering (deblocking filtering) process of reducing a distortion occurring at a boundary between transformation blocks and a distortion occurring at a boundary between prediction blocks, a process (pixel adaptive offset process) of adaptively adding an offset on a per pixel basis, an adaptive filtering process of adaptively switching among linear filters, such as Wiener filters, and performing the filtering process, and so on.

However, as to each of the above-described filtering processes including the deblocking filtering process, the pixel adaptive offset process, and the adaptive filtering process, the loop filter unit 38 refers to each header information variable-length-decoded by the variable length decoding unit 31 to determine whether or not to perform the process on the slice currently being processed.

At that time, in the case in which the loop filter unit 11 of the color image encoding device is configured as shown in FIG. 11, for example, when performing two or more filtering processes, the loop filter unit 38 is configured as shown in FIG. 12.

In the deblocking filtering process, the loop filter unit refers to the header information variable-length-decoded by the variable length decoding unit 31, and, when there exists information for changing the various parameters used for the selection of the intensity of a filter applied to a block boundary from their initial values, performs the deblocking filtering process on the basis of the change information. When no change information exists, the loop filter unit performs the deblocking filtering process according to a predetermined method.

In the pixel adaptive offset process, the loop filter unit partitions the decoded image into blocks on the basis of the block partitioning information for the pixel adaptive offset process, which is variable-length-decoded by the variable length decoding unit 31, refers to the index variable-length-decoded by the variable length decoding unit 31 and indicating the class classifying method of each of the blocks on a per block basis, and, when the index does not indicate "does not perform the offset process", performs a class classification on each pixel in each of the blocks according to the class classifying method indicated by the above-described index.

As candidates for the class classifying method, the same candidates as those for the class classifying method of the pixel adaptive offset process performed by the loop filter unit 11 are prepared in advance.

The loop filter unit 38 then refers to the offset information specifying the offset value calculated for each class on a per block basis and variable-length-decoded by the variable length decoding unit 31, and performs a process of adding the offset to the luminance value of the decoded image.

In the adaptive filtering process, after performing a class classification according to the same method as that used by the color image encoding device shown in FIG. 1, the loop filter unit performs the filtering process by using the filter for each class, which is variable-length-decoded by the variable length decoding unit 31, on the basis of information about the class classification.

The decoded image on which the filtering process is performed by this loop filter unit 38 is provided as a reference image for motion-compensated prediction, and is determined as a reproduced image.

As can be seen from the above description, in accordance with this Embodiment 1, the intra prediction unit 4 is configured in such a way as to, when the signal format of the color image is YUV4:2:2, and the intra prediction parameter, which is used for the intra-frame prediction process on the chrominance signals in a prediction block, shows the same prediction mode as the intra prediction mode for the luminance signal in the prediction block, convert the index indicating the intra prediction mode for the luminance signal, and performs the intra-frame prediction process on the chrominance signals in the intra prediction mode indicated by the index after conversion, there is provided an advantage of being able to improve the coding efficiency without causing a reduction in the prediction efficiency of the chrominance signals even when the signal format of the color image is YUV4:2:2.

Further, in accordance with this Embodiment 1, when the signal format of the color image is YUV4:2:2 and it is shown that as the intra prediction mode in which to predict chrominance signals of a block which is the target for prediction, the intra prediction mode common between luminance and chrominances, in which the same prediction mode as that for the luminance signal is used, is used, the color image decoding device is configured in such a way as to convert the index indicating the intra prediction mode for the luminance signal, and perform the intra-frame prediction process on the chrominance signals of the block which is the target for prediction by using the intra prediction mode indicated by the index after conversion, there is provided an advantage of being able to implement a high-accuracy prediction process and correctly decode the bitstream encoded by the color image encoding device of Embodiment 1 that can improve the coding efficiency.

While the invention has been described in its preferred embodiment, it is to be understood that various changes can be made in an arbitrary component in accordance with the embodiment, and an arbitrary component in accordance with the embodiment can be omitted within the scope of the invention.

INDUSTRIAL APPLICABILITY

Because the color image encoding device in accordance with the present invention converts the index indicating the intra prediction mode for the luminance signal and performs the intra-frame prediction process on the chrominance signals in the intra prediction mode indicated by the index after conversion when the signal format of the color image is YUV4:2:2, the color image encoding device is suitable for used as a color image encoding device that can improve the coding efficiency without causing a reduction in the prediction efficiency of the chrominance signals even when the signal format of the color image is YUV4:2:2, and that encodes a color video with a high degree of efficiency.

EXPLANATIONS OF REFERENCE NUMERALS 101 block partitioning unit, 2 encoding controlling unit, 3 select switch, 4 intra prediction unit (intra predictor), 5 motion-compensated prediction unit, 6 subtracting unit, 7 transformation/quantization unit, 8 inverse quantization/inverse transformation unit, 9 adding unit, 10 memory for intra prediction, 11 loop filter unit, 12 motion-compensated prediction frame memory, 13 variable length encoding unit, 14 slice partitioning unit, 31 variable length decoding unit, 32 inverse quantization/inverse transformation unit, 33 select switch, 34 intra prediction unit (intra predictor), 35 motion compensation unit, 36 adding unit, 37 memory for intra prediction, 38 loop filter unit, and 39 motion-compensated prediction frame memory.

The invention claimed is:

1. A color image encoding device comprising:
   a block partitioner to partition an inputted image into largest coding blocks each having a largest size in an encoding process and partition each of coding blocks into which each of said largest coding blocks is hierarchically partitioned into prediction blocks each of which is a unit for setting of an intra prediction parameter, and also partition each of said coding blocks into transformation blocks each of which is a unit for compression of a difference image;
   an intra predictor to perform an intra-frame prediction process on each of said transformation blocks by using an intra prediction parameter set for each of said prediction blocks, to generate a prediction image;

a difference image generator to generate a difference image between said inputted image and the prediction image generated by said intra predictor; and a compressor to compress the difference image generated by said difference image generator for each of said transformation blocks, and output compressed data, wherein when a signal format of said inputted image is YUV4:2:2 and when an intra prediction mode for chrominance signals is same as an intra prediction mode for a luminance signal, said intra predictor converts an index which is specified from the intra prediction mode for the luminance signal, the intra prediction mode being a part of said intra prediction parameter, and performs the intra-frame prediction process on the chrominance signals by using an intra prediction mode indicated by the index after conversion.

2. A color image decoding device comprising:

a block partitioner to partition a coding block into prediction blocks each of which is a unit for setting of an intra prediction parameter, and also partition said coding block into transformation blocks each of which is a unit for compression of a difference image;

an intra predictor to perform an intra-frame prediction process on each of said transformation blocks by using an intra prediction parameter set for each of said prediction blocks, to generate a prediction image;

a difference image generator to generate a difference image before compression for each of said transformation blocks from compressed data; and a decoded image generator to add the difference image generated by said difference image generator and the prediction image generated by said intra predictor, to generate a decoded image, wherein when a signal format of said decoded image is YUV4:2:2 and when an intra prediction mode for chrominance signals is same as an intra prediction mode for a luminance signal, said intra predictor converts an index which is specified from the intra prediction mode for a luminance signal, the intra prediction mode being a part of said intra prediction parameter, and performs the intra-frame prediction process on the chrominance signals by using an intra prediction mode indicated by the index after conversion.

3. A color image encoding method comprising:

a block partitioning step of a block partitioner partitioning an inputted image into largest coding blocks each having a largest size in an encoding process and partitioning each of coding blocks into which each of said largest coding blocks is hierarchically partitioned into prediction blocks each of which is a unit for setting of an intra prediction parameter, and also partitioning each of said coding blocks into transformation blocks each of which is a unit for compression of a difference image;

an intra prediction processing step of an intra predictor performing an intra-frame prediction process on each of said transformation blocks by using an intra prediction parameter set for each of said prediction blocks, to generate a prediction image;

a difference image generating step of a difference image generator generating a difference image between said inputted image and the prediction image generated in said intra prediction processing step; and a compressing step of a compressor compressing the difference image generated in said difference image generating step for each of said transformation blocks, and outputting compressed data, wherein in said intra prediction processing step, when a signal format of said inputted image is YUV4:2:2 and when an intra prediction mode for chrominance signals is same as an intra prediction mode for a luminance signal, an index which is specified from the intra prediction mode for a luminance signal, the intra prediction mode being a part of said intra prediction parameter, and the intra-frame prediction process on the chrominance signals is performed in an intra prediction mode indicated by the index after conversion.

4. A color image decoding method comprising:

a block partitioning step of a block partitioner partitioning a coding block into prediction blocks each of which is a unit for setting of an intra prediction parameter, and also partitioning said coding block into transformation blocks each of which is a unit for compression of a difference image;

an intra prediction processing step of an intra predictor performing an intra-frame prediction process on each of said transformation blocks by using an intra prediction parameter set for each of said prediction blocks, to generate a prediction image;

a difference image generating step of a difference image generator generating a difference image before compression for each of said transformation blocks from compressed data; and a decoded image generating step of a decoded image generator adding the difference image generated in said difference image generating step and the prediction image generated in said intra prediction step, to generate a decoded image, wherein in said intra prediction processing step, when a signal format of said decoded image is YUV4:2:2 and when an intra prediction mode for chrominance signals is same as an intra prediction mode for a luminance signal, an index which is specified from the an intra prediction mode for a luminance signal, the intra prediction modes being a part of said intra prediction parameter, and the intra-frame prediction process on the chrominance signals is performed by using an intra prediction mode indicated by the index after conversion.

* * * * *